(12) United States Patent
McInerny

(10) Patent No.: US 10,296,558 B1
(45) Date of Patent: May 21, 2019

(54) REMOTE GENERATION OF COMPOSITE CONTENT PAGES

(75) Inventor: Michael J. McInerny, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 681 days.

(21) Appl. No.: 13/406,380

(22) Filed: Feb. 27, 2012

(51) Int. Cl.
*G06F 17/21* (2006.01)

(52) U.S. Cl.
CPC .................................. *G06F 17/211* (2013.01)

(58) Field of Classification Search
CPC .................................................. G06F 17/2247
USPC ....................................................... 715/234
See application file for complete search history.

(56) References Cited

U.S. PATENT DOCUMENTS

| | | |
|---|---|---|
| 5,634,064 A | 5/1997 | Warnock et al. |
| 5,872,850 A | 2/1999 | Klein et al. |
| 5,961,593 A | 10/1999 | Gabber et al. |
| 6,049,812 A | 4/2000 | Bertram et al. |
| 6,108,637 A | 8/2000 | Blumenau |
| 6,138,156 A | 10/2000 | Fletcher et al. |
| 6,195,679 B1 | 2/2001 | Bauersfeld et al. |
| 6,412,008 B1 * | 6/2002 | Fields ................. H04L 67/2823 709/205 |
| 6,430,624 B1 | 8/2002 | Jamtgaard et al. |
| 6,549,941 B1 | 4/2003 | Jaquith et al. |
| 6,560,620 B1 | 5/2003 | Ching |
| 6,625,624 B1 | 9/2003 | Chen et al. |
| 6,704,024 B2 | 3/2004 | Robotham et al. |
| 6,785,864 B1 | 8/2004 | Te et al. |
| 6,832,355 B1 * | 12/2004 | Duperrouzel ..... G06F 17/30905 707/E17.121 |
| 6,871,236 B2 | 3/2005 | Fishman et al. |
| 6,944,665 B2 | 9/2005 | Brown et al. |
| 6,963,850 B1 | 11/2005 | Bezos et al. |
| 6,976,210 B1 * | 12/2005 | Silva ................. G06F 17/30867 707/E17.109 |

(Continued)

FOREIGN PATENT DOCUMENTS

WO    WO 2013/003631 A2    1/2013

OTHER PUBLICATIONS

Close 'n' Forget Firefox add on, Evilfantasy's blog, http://evilfantasy.wordpress.com/2009/03/24/close-%E2%80%98n%E2%80%99-forget-firefox-add-on/, retrieved Mar. 24, 2009, 1 page.

(Continued)

*Primary Examiner* — Frank D Mills
(74) *Attorney, Agent, or Firm* — Knobbe, Martens, Olson & Bear, LLP

(57) ABSTRACT

Features are disclosed for creating composite content pages comprising items from various network-enabled content pages. Selection of items to include in a composite page is not limited to items formatted or exposed by content providers in a specific format, such as RSS. A network computing component can retrieve, process, and format content from any content provider, and then generate a composite page containing the selected content items in a format specified by a user or automatically determined by the network computing component. Additionally, the content items can be processed to reduce or prevent the likelihood of security issues that may arise when compiling content from different content providers into a single composite page.

24 Claims, 17 Drawing Sheets

(56) References Cited

U.S. PATENT DOCUMENTS

| | | | |
|---|---|---|---|
| 7,003,442 B1 | 2/2006 | Tsuda | |
| 7,013,310 B2* | 3/2006 | Messing et al. | 707/709 |
| 7,051,084 B1 | 5/2006 | Hayton et al. | |
| 7,054,952 B1 | 5/2006 | Schwerdtfeger et al. | |
| 7,085,736 B2 | 8/2006 | Keezer et al. | |
| 7,159,023 B2 | 1/2007 | Tufts | |
| 7,171,478 B2 | 1/2007 | Lueckhoff et al. | |
| 7,191,211 B2 | 3/2007 | Tuli | |
| 7,353,252 B1 | 4/2008 | Yang et al. | |
| 7,373,313 B1 | 5/2008 | Kahle et al. | |
| 7,543,059 B2 | 6/2009 | Johnson et al. | |
| 7,792,944 B2 | 9/2010 | DeSantis et al. | |
| 7,831,582 B1 | 11/2010 | Scofield et al. | |
| 7,975,000 B2 | 7/2011 | Dixon et al. | |
| 7,996,912 B2 | 8/2011 | Spalink et al. | |
| 8,010,545 B2 | 8/2011 | Stefik et al. | |
| 8,015,496 B1 | 9/2011 | Rogers | |
| 8,060,463 B1 | 11/2011 | Spiegel | |
| 8,073,850 B1 | 12/2011 | Hubbard et al. | |
| 8,103,742 B1 | 1/2012 | Green | |
| 8,185,621 B2 | 5/2012 | Kasha | |
| 8,185,819 B2* | 5/2012 | Sah | G06F 17/3089 715/234 |
| 8,249,904 B1 | 8/2012 | DeSantis et al. | |
| 8,271,887 B2 | 9/2012 | Offer et al. | |
| 8,316,124 B1 | 11/2012 | Baumback et al. | |
| 8,336,049 B2 | 12/2012 | Medovich | |
| 8,527,860 B1* | 9/2013 | Colton | G06F 17/30893 709/203 |
| 8,566,137 B1* | 10/2013 | Cabrera et al. | 705/7.22 |
| 8,819,539 B1* | 8/2014 | Colton | G06F 17/30902 707/755 |
| 8,950,007 B1* | 2/2015 | Teal | G06F 21/57 726/30 |
| 9,122,650 B1* | 9/2015 | Colton | G06F 17/20 |
| 2001/0037359 A1* | 11/2001 | Mockett et al. | 709/203 |
| 2001/0039490 A1 | 11/2001 | Verbitsky et al. | |
| 2002/0005867 A1* | 1/2002 | Gvily | 345/760 |
| 2002/0015042 A1* | 2/2002 | Robotham | G06F 3/14 345/581 |
| 2002/0023141 A1* | 2/2002 | Yen | G06F 17/30902 709/217 |
| 2002/0030703 A1 | 3/2002 | Robertson et al. | |
| 2002/0194302 A1 | 12/2002 | Blumberg | |
| 2003/0005002 A1* | 1/2003 | Chen | G06F 17/212 715/234 |
| 2003/0018543 A1* | 1/2003 | Alger | G06Q 30/06 705/26.1 |
| 2003/0023712 A1 | 1/2003 | Zhao et al. | |
| 2003/0033434 A1* | 2/2003 | Kavacheri et al. | 709/246 |
| 2003/0041106 A1 | 2/2003 | Tuli | |
| 2003/0101412 A1* | 5/2003 | Eid | G06F 17/30893 715/234 |
| 2003/0149646 A1* | 8/2003 | Chen et al. | 705/35 |
| 2003/0233425 A1* | 12/2003 | Lyons et al. | 709/217 |
| 2004/0083294 A1 | 4/2004 | Lewis | |
| 2004/0083428 A1* | 4/2004 | Slade | G06F 17/30899 715/205 |
| 2004/0139208 A1 | 7/2004 | Tuli | |
| 2004/0181613 A1 | 9/2004 | Hashimoto et al. | |
| 2004/0205448 A1 | 10/2004 | Grefenstette et al. | |
| 2004/0220905 A1 | 11/2004 | Chen et al. | |
| 2004/0243622 A1 | 12/2004 | Morisawa | |
| 2004/0268228 A1* | 12/2004 | Croney | G06F 17/3089 715/255 |
| 2005/0010634 A1* | 1/2005 | Henderson | G06F 17/30873 709/201 |
| 2005/0010863 A1 | 1/2005 | Zernik | |
| 2005/0027823 A1* | 2/2005 | Rana | 709/219 |
| 2005/0060643 A1 | 3/2005 | Glass et al. | |
| 2005/0097190 A1* | 5/2005 | Abdelhak | 709/217 |
| 2005/0138382 A1 | 6/2005 | Hougaard et al. | |
| 2005/0160014 A1* | 7/2005 | Moss et al. | 705/26 |
| 2005/0183039 A1 | 8/2005 | Revis | |
| 2005/0246193 A1 | 11/2005 | Roever et al. | |
| 2005/0256940 A1* | 11/2005 | Henderson | G06F 17/30902 709/219 |
| 2005/0267869 A1* | 12/2005 | Horvitz | G06F 17/30867 |
| 2006/0015594 A1* | 1/2006 | Kontamsetty | G06F 17/24 709/221 |
| 2006/0085766 A1 | 4/2006 | Dominowska et al. | |
| 2006/0095336 A1 | 5/2006 | Heckerman et al. | |
| 2006/0122889 A1 | 6/2006 | Burdick et al. | |
| 2006/0168510 A1 | 7/2006 | Bryar et al. | |
| 2006/0184421 A1 | 8/2006 | Lipsky et al. | |
| 2006/0230021 A1* | 10/2006 | Diab et al. | 707/3 |
| 2006/0235935 A1* | 10/2006 | Ng | G06F 17/30867 709/208 |
| 2006/0242192 A1* | 10/2006 | Musgrove et al. | 707/102 |
| 2006/0248442 A1 | 11/2006 | Rosenstein et al. | |
| 2006/0259462 A1* | 11/2006 | Timmons | 707/3 |
| 2006/0277167 A1 | 12/2006 | Gross et al. | |
| 2006/0294461 A1 | 12/2006 | Nadamoto et al. | |
| 2007/0022072 A1 | 1/2007 | Kao et al. | |
| 2007/0027672 A1 | 2/2007 | Decary et al. | |
| 2007/0094241 A1 | 4/2007 | Blackwell et al. | |
| 2007/0124693 A1 | 5/2007 | Dominowska et al. | |
| 2007/0130518 A1* | 6/2007 | Shavit et al. | 715/530 |
| 2007/0139430 A1 | 6/2007 | Korn et al. | |
| 2007/0150883 A1* | 6/2007 | Cohen | G06F 9/44526 717/168 |
| 2007/0180367 A1* | 8/2007 | Chiang | G06F 17/30905 715/234 |
| 2007/0240160 A1 | 10/2007 | Paterson-Jones et al. | |
| 2007/0288589 A1 | 12/2007 | Chen et al. | |
| 2008/0028334 A1 | 1/2008 | De Mes | |
| 2008/0104502 A1 | 5/2008 | Olston | |
| 2008/0127133 A1* | 5/2008 | Aghara | G06F 17/3089 717/140 |
| 2008/0183672 A1 | 7/2008 | Canon et al. | |
| 2008/0184128 A1 | 7/2008 | Swenson et al. | |
| 2008/0288486 A1* | 11/2008 | Kim et al. | 707/5 |
| 2008/0295164 A1* | 11/2008 | Steiner | H04L 63/10 726/14 |
| 2008/0320225 A1 | 12/2008 | Panzer et al. | |
| 2009/0012969 A1 | 1/2009 | Rail et al. | |
| 2009/0055727 A1* | 2/2009 | Hansen et al. | 715/234 |
| 2009/0070663 A1* | 3/2009 | Fan | G06F 21/566 715/234 |
| 2009/0164924 A1 | 6/2009 | Flake et al. | |
| 2009/0204478 A1 | 8/2009 | Kaib et al. | |
| 2009/0217199 A1 | 8/2009 | Hera et al. | |
| 2009/0248680 A1 | 10/2009 | Kalavade | |
| 2009/0254867 A1 | 10/2009 | Farouki et al. | |
| 2009/0282021 A1 | 11/2009 | Bennett | |
| 2009/0287698 A1 | 11/2009 | Marmaros et al. | |
| 2009/0327914 A1 | 12/2009 | Adar et al. | |
| 2010/0005069 A1* | 1/2010 | Wang | G06F 17/30867 707/E17.108 |
| 2010/0036740 A1 | 2/2010 | Barashi | |
| 2010/0037145 A1* | 2/2010 | Sides | 715/744 |
| 2010/0057639 A1 | 3/2010 | Schwarz et al. | |
| 2010/0125507 A1 | 5/2010 | Tarantino, III et al. | |
| 2010/0131594 A1 | 5/2010 | Kashimoto | |
| 2010/0138293 A1 | 6/2010 | Ramer et al. | |
| 2010/0145902 A1* | 6/2010 | Boyan et al. | 706/54 |
| 2010/0218106 A1 | 8/2010 | Chen et al. | |
| 2010/0281400 A1* | 11/2010 | Forutanpour | G06F 3/048 715/760 |
| 2010/0293190 A1 | 11/2010 | Kaiser et al. | |
| 2010/0312788 A1 | 12/2010 | Bailey | |
| 2010/0318892 A1 | 12/2010 | Teevan et al. | |
| 2010/0332513 A1 | 12/2010 | Azar et al. | |
| 2011/0022957 A1 | 1/2011 | Lee | |
| 2011/0029854 A1 | 2/2011 | Nashi et al. | |
| 2011/0055203 A1 | 3/2011 | Gutt et al. | |
| 2011/0078140 A1 | 3/2011 | Dube et al. | |
| 2011/0078705 A1 | 3/2011 | Maclinovsky et al. | |
| 2011/0106835 A1* | 5/2011 | Lauridsen | G06F 17/3089 707/769 |
| 2011/0119661 A1 | 5/2011 | Agrawal et al. | |

(56) References Cited

U.S. PATENT DOCUMENTS

| | | | |
|---|---|---|---|
| 2011/0119722 A1* | 5/2011 | Kellerman | G06F 17/30905 725/110 |
| 2011/0161849 A1 | 6/2011 | Stallings et al. | |
| 2011/0173177 A1 | 7/2011 | Junqueira et al. | |
| 2011/0173637 A1 | 7/2011 | Brandwine et al. | |
| 2011/0178868 A1 | 7/2011 | Garg et al. | |
| 2011/0185025 A1 | 7/2011 | Cherukuri et al. | |
| 2011/0191327 A1 | 8/2011 | Lee | |
| 2011/0197121 A1 | 8/2011 | Kieffer | |
| 2011/0197272 A1* | 8/2011 | Mony | G06F 21/566 726/12 |
| 2011/0202848 A1* | 8/2011 | Ismalon | G06F 17/3089 715/738 |
| 2011/0246873 A1 | 10/2011 | Tolle et al. | |
| 2011/0256889 A1* | 10/2011 | Polis et al. | 455/456.3 |
| 2011/0289074 A1 | 11/2011 | Leban | |
| 2011/0296341 A1 | 12/2011 | Koppert | |
| 2011/0302510 A1 | 12/2011 | Harrison et al. | |
| 2012/0072821 A1 | 3/2012 | Bowling | |
| 2012/0084644 A1 | 4/2012 | Robert et al. | |
| 2012/0096365 A1 | 4/2012 | Wilkinson et al. | |
| 2012/0110017 A1 | 5/2012 | Gu et al. | |
| 2012/0136922 A1* | 5/2012 | Falkenberg | G06F 17/3089 709/203 |
| 2012/0137201 A1 | 5/2012 | White et al. | |
| 2012/0143944 A1 | 6/2012 | Reeves et al. | |
| 2012/0150844 A1 | 6/2012 | Lindahl et al. | |
| 2012/0166526 A1* | 6/2012 | Ambardekar | 709/203 |
| 2012/0166922 A1 | 6/2012 | Rolles | |
| 2012/0198516 A1 | 8/2012 | Lim | |
| 2012/0215834 A1 | 8/2012 | Chen et al. | |
| 2012/0215919 A1 | 8/2012 | Labat et al. | |
| 2012/0284629 A1 | 11/2012 | Peters et al. | |
| 2012/0317244 A1* | 12/2012 | Liang | H04L 67/02 709/219 |
| 2012/0317295 A1 | 12/2012 | Baird et al. | |
| 2012/0331406 A1 | 12/2012 | Baird et al. | |
| 2013/0007101 A1 | 1/2013 | Trahan et al. | |
| 2013/0007102 A1 | 1/2013 | Trahan et al. | |
| 2013/0031461 A1 | 1/2013 | Hou et al. | |
| 2013/0080611 A1 | 3/2013 | Li et al. | |
| 2013/0081135 A1* | 3/2013 | Podjarny | H04L 63/1441 726/22 |
| 2013/0111584 A1* | 5/2013 | Coppock | H04L 63/145 726/22 |
| 2015/0100631 A1* | 4/2015 | Jenkins et al. | 709/203 |

OTHER PUBLICATIONS

Bango, Rey "How JS & Ajax work in Opera Mini 4", Nov. 2, 2007, XP055050107, Retrieved from the Internet.

Brinkmann, M, "Record and Share your browser history with Hooeey," ghacks.net, Feb. 26, 2008, 6 pages, printed on Jan. 25, 2013.

Considine, A, "The Footprints of Web Feet," The New York Times, Mar. 4, 2011, 3 pages, printed on Jan. 25, 2013.

EyeBrowse: Record, Visualize and Share your Browser History, Information Aesthetics, Sep. 18, 2009, 2 pages, printed on Jan. 25, 2013.

Feuerstein, Adam, "Flyswat Takes Aim," San Francisco Business Times, printed from http://www.bizjournals.com/sanfrancisco/stories/1999/10/25/story2.html?t=printable, Oct. 22, 1999, 2 pages.

Gabber et al., "How to Make Personalized Web Browsing Simple, Secure, and Anonymous," Financial Cryptography, 16 pages. (1997).

Gingerich, Jason, "Keycorp Making Site Into Portal," KRTBN Knight-Ridder Tribune Business News (South Bend Tribune, Indiana), Oct. 25, 1999, 2 pages.

Hopper, D. Ian, "Desktops Now Have Power to Comparison-Shop," Oct. 18, 1999, printed from http://www.cnn.com/Tech/computing/9910/18/r.u.sure/index.html, 3 pages.

Van Kleek, M, Introducing "Eyebrowse"—Track and share your web browsing in real time, Haystack Blog, Aug. 28, 2009, 3 pages, printed on Jan. 25, 2013.

Web page titled "RSS Ticker: Add-ons for Firefox," https://addons.mozilla.org/en-US/firefox/addon/rss-ticker/, 3 printed pages, printed on Feb. 7, 2013.

Web page titled "What Internet Users Do on a Typical Day, Trend Data (Adults), Pew Internet & American Life Project," printed from http://pewinternet.org/Static-Pages/Trend-Data-(Adults)/Online-Activities-Daily.aspx on Nov. 29, 2012, 4 pages.

Rao, H.C.-H.,et al., "A Proxy-Based Personal Web Archiving Service," Operating Systems Review, 35(1):61-72, 2001.

Teevan, J., et al., "Changing How People View Changes on the Web," 2009, Proceedings of the $22^{nd}$ Annual ACM Symposium on User Interface Software and Technology, New York, 2009, pp. 237-246.

Baumann, A., et al., Enhancing STEM Classes Using Weave: A Collaborative Web-Based Visualization Environment, Integrated Stem Education Conference, Apr. 2, 2011, Ewing, New Jersey, pp. 2A-1-2A-4.

De Carvalho, L.G., et al., Synchronizing Web Browsing Data With Browserver, Proceedings of the IEEE Symposium on Computers and Communications, Jun. 22-25, 2010, Riccione, Italy, pp. 738-743.

Chen, H., et al., "Bringing Order to the Web: Automatically Categorizing Search Results," Proceedings of the SIGCHI Conference on Human Factors in Computing Systems, Apr. 1-6, 2000, pp. 145-152.

* cited by examiner

REMOTE GENERATION OF COMPOSITE CONTENT PAGES

BACKGROUND

Generally described, computing devices and communication networks can be utilized to exchange information. In a common application, a computing device can request content from another computing device via the communication network. For example, a user at a personal computing device can utilize a software browser application, typically referred to as a browser software application, to request a Web page from a server computing device via the Internet. In such embodiments, the user computing device can be referred to as a client computing device and the server computing device can be referred to as a content provider.

With reference to an illustrative example, a requested Web page, or original content, may be associated with a number of additional resources, such as images or videos, that are to be displayed with the Web page. In one specific embodiment, the additional resources of the Web page are identified by a number of embedded resource identifiers, such as uniform resource locators ("URLs"). In turn, software on the client computing devices, such as a browser software application, typically processes embedded resource identifiers to generate requests for the content. Accordingly, in order to satisfy a content request, one or more content providers will generally provide client computing devices data associated with the Web page as well as the data associated with the embedded resources.

Once the client computing device obtains the Web page and associated additional resources, the content may be processed in a number of stages by the software browser application or other client computing device interface. For example, and with reference to the above illustration, the software browser application may parse the Web page to process various HTML layout information and references to associated resources, may identify and process Cascading Style Sheets ("CSS") information, may process and instantiate various JavaScript code associated with the Web page, may construct a native object model to represent one or more components of the Web page, and may calculate various layout and display properties of the processed content for presentation to a user.

Users may define and access personal portals, which are typically composite pages containing content from a number of different content sources. The content available to add to personal portals may be limited by the portal provider. For example, content exposed by content providers in RSS feeds may be included in a personal portal. The portal provider may also develop applets or widgets that a user can add to the personal portal, and the widgets can provide access to information that is not exposed through an RSS feed. In some cases the content available to add to a portal may be limited for security reasons, because compilation of content from various sources may expose a user or client computing device to security vulnerabilities, such as cross-site scripting attacks.

BRIEF DESCRIPTION OF THE DRAWINGS

Embodiments of various inventive features will now be described with reference to the following drawings, wherein.

DETAILED DESCRIPTION

Figure 1:
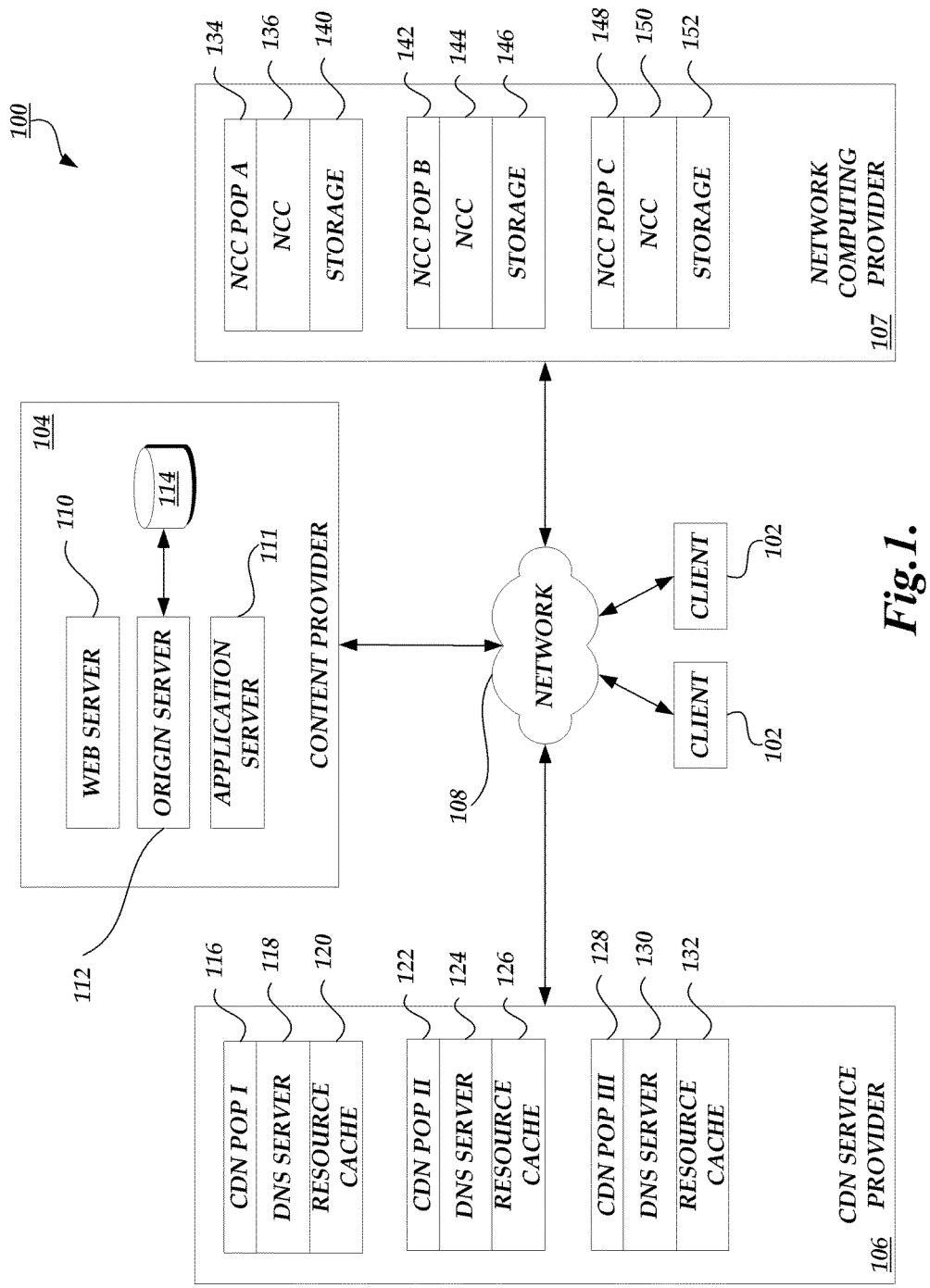
FIG. 1 is a block diagram illustrative of a content delivery environment including a number of client computing devices, content provider, a content delivery network service provider, and a network computing provider.

Generally described, the present disclosure is directed to the definition and generation of composite pages containing content items from different content sources. Specifically, aspects of the disclosure will be described with regard to the selection, by a user of a client device, of content items from various sources for inclusion in a composite page. A user can view and optionally interact with each of the content items in the composite page, regardless of the source of the content item. For example, the user is not limited to Really Simple Syndication (RSS) feeds or predefined widgets when creating a personal portal or other composite page. Rather the user can select any type of content from any network resource without requiring the content provider to provide the content in a specific consumable format. A network computing component can retrieve, process, and format the content for the user, returning to the user a composite page containing the selected content items in a format specified by the user or automatically determined by the network computing component.

Other aspects of the present disclosure relate to the automatic determination of default content items for any network resource, so that the user need not specify which specific content item to add to the composite page, and also so that the network computing component can include the default content item in the composite page when the selected content item is not available. Additionally, further aspects of the present disclosure relate to prevention of security issues that may arise when compiling content from different content providers into a single composite page.

Although aspects of the embodiments described in the disclosure will focus, for the purpose of illustration, on the processing by a network computing provider, one skilled in the art will appreciate that the techniques disclosed herein may be applied to any number of hardware or software processes or applications. Further, although various aspects of the disclosure will be described with regard to illustrative examples and embodiments, one skilled in the art will appreciate that the disclosed embodiments and examples should not be construed as limiting.

With reference to an illustrative embodiment, a user of a client computing device can launch a software browser application (browser) and issue requests for network resources, such as web pages, images, videos, applets, documents, and other content pages. Rather than issue the requests directly to the content provider or other content source, as may happen in a typical environment, the request can be issued to a network computing provider configured to provide additional processing features and capabilities, such as remote generation of composite content pages. The network computing provider may have any number of network computing components (NCCs), such as web servers, proxy servers, application servers, and the like.

An NCC can receive, from a client computing device, a request for a web page. The NCC can launch a virtual machine instance to process the request, retrieve the requested resources, and process the retrieved resources. In some embodiments, the virtual machine instance can include a browser configured to perform the same or similar processing to web pages as the browser application on the client computing device. The NCC can retrieve the requested web page, and determine which processing actions are to be performed by the browser at the NCC and which are to be performed by the browser at the client computing device. The NCC can then perform any processing actions assigned to the NCC, and transmit a response to the client computing device. Upon receipt of the response, the client computing device can then perform any remaining processing actions and display the web page to the user. The client computing device and the NCC may repeat this process as desired by the user of the client computing device.

The client computing device and the NCC can exchange interaction information throughout the browsing session. In some embodiments, the interaction information can include data representing selections, by the user, of one or more content items within a web page. In some embodiments, the selected content items may come from various unrelated web pages. The selected content items can include any portion of content on a web page, without requiring content syndication technology such as RSS. For example, a user may select various calendars, stock tickers, and weather forecasts to include the composite page. The NCC can be configured to retrieve the web page containing each selected content item and to extract the content item without requiring additional configuration or processing by the content provider.

Upon request by the user, or in response to some other event, the NCC can generate a composite web page that contains a representation of each content item selected by the user of the client computing device. The NCC can launch a browser application to retrieve and render the web pages that contain each selected content item. The NCC can then copy each selected content item from the rendered pages, and generate a composite page containing a representation of each selected content item. A representation may be an image of the content item, the text of the content item, a fully rendered portion of the HTML of the page, and the like. The NCC can utilize a separate browser application to retrieve and render each web page containing a content item. By doing so, the NCC can reduce or eliminate the potential for cross-site scripting attacks and other security issues that may arise when including content from various sources in a single web page. Such security risks can be further mitigated by the way in which the NCC generates the composite page, such as by only including the text or a static image representation of each selected content item.

FIG. 1 is a block diagram illustrative of a networked computing environment 100 for the management and processing of content requests. As illustrated in FIG. 1, the networked computing environment 100 includes a number of client computing devices 102 (generally referred to as clients) for requesting content and content processing from a content provider 104, CDN service provider 106, or network computing provider 107. In an illustrative embodiment, the client computing devices 102 can correspond to a wide variety of computing devices including personal computing devices, laptop computing devices, hand-held computing devices, terminal computing devices, mobile devices (e.g., mobile phones, tablet computing devices, etc.), wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet. The client computing devices 102 may have varied local computing resources such as central processing units and architectures, memory, mass storage, graphics processing units, communication network availability and bandwidth, etc.

The networked computing environment 100 can also include a content provider 104 in communication with the one or more client computing devices 102 or other service providers (e.g., CDN service provider 106, network computing provider 107, etc.) via the communication network 108. The content provider 104 illustrated in FIG. 1 corresponds to a logical association of one or more computing devices associated with a content provider. Specifically, the content provider 104 can include a web server component 110 corresponding to one or more server computing devices for obtaining and processing requests for content (such as Web pages) from the client computing devices 102 or other service providers. The content provider 104 can further include an origin server component 112 and associated storage component 114 corresponding to one or more computing devices for obtaining and processing requests for network resources from the CDN service provider. The content provider 104 can still further include an application server computing device 111, such as a data streaming server, for processing streaming content requests. One skilled in the relevant art will appreciate that the content provider 104 can be associated with various additional computing resources, such as additional computing devices for administration of content and resources, DNS name servers, and the like. For example, although not illustrated in FIG. 1, the content provider 104 can be associated with one or more DNS name server components that would be authoritative to resolve client computing device DNS queries corresponding to a domain of the content provider.

With continued reference to FIG. 1, the networked computing environment 100 can further include a CDN service provider 106 in communication with the one or more client computing devices 102 and other service providers via the communication network 108. The CDN service provider 106 illustrated in FIG. 1 corresponds to a logical association of one or more computing devices associated with a CDN service provider. Specifically, the CDN service provider 106 can include a number of Point of Presence ("POP") locations 116, 122, 128 that correspond to nodes on the communication network 108. Each CDN POP 116, 122, 128 includes a DNS component 118, 124, 130 made up of a number of DNS server computing devices for resolving DNS queries from the client computers 102. Each CDN POP 116, 122, 128 also includes a resource cache component 120, 126, 132 made up of a number of cache server computing devices for storing resources from content providers and transmitting various requested resources to various client computers. The DNS components 118, 124, and 130 and the resource cache components 120, 126, 132 may further include additional software and/or hardware components that facilitate communications including, but not limited to, load balancing or load sharing software/hardware components.

In an illustrative embodiment, the DNS component 118, 124, 130 and resource cache component 120, 126, 132 are considered to be logically grouped, regardless of whether the components, or portions of the components, are physically separate. Additionally, although the CDN POPs 116, 122, 128 are illustrated in FIG. 1 as logically associated with the CDN service provider 106, the CDN POPs will be geographically distributed throughout the communication network 108 in a manner to best serve various demographics of client computing devices 102. Additionally, one skilled in the relevant art will appreciate that the CDN service provider 106 can be associated with various additional computing resources, such as additional computing devices for administration of content and resources, and the like.

With further continued reference to FIG. 1, the networked computing environment 100 can also include a network computing provider 107 in communication with the one or more client computing devices 102, the CDN service provider 106, and the content provider 104 via the communication network 108. The network computing provider 107 illustrated in FIG. 1 also corresponds to a logical association of one or more computing devices associated with a network computing provider. Specifically, the network computing provider 107 can include a number of Point of Presence ("POP") locations 134, 142, 148 that correspond to nodes on the communication network 108. Each POP 134, 142, 148 includes a network computing component (NCC) 136, 144, 150 for hosting applications, such as data streaming applications, via a number of instances of a virtual machine, generally referred to as an instance of an NCC. One skilled in the relevant art will appreciate that NCC 136, 144, 150 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 134, 142, 148 also includes a storage component 140, 146, 152 made up of a number of storage devices for storing any type of data used in the delivery and processing of network or computing resources, including but not limited to user data, state information, processing requirements, historical usage data, content item selections, representations of selected content items, and resources from content providers that will be processed by an instance of an NCC 136, 144, 150 and transmitted to various client computers, etc. The NCCs 136, 144, 150 and the storage components 140, 146, 152 may further include additional software and/or hardware components that facilitate communications including, but not limited to, load balancing or load sharing software/hardware components for selecting instances of a virtual machine supporting a requested application and/or providing information to a DNS nameserver to facilitate request routing.

In an illustrative embodiment, NCCs 136, 144, 150 and the storage components 140, 146, 152 are considered to be logically grouped, regardless of whether the components, or portions of the components, are physically separate. For example, a network computing provider 107 may maintain separate POPs for providing the NCC and the storage components. Additionally, although the NCC POPs 134, 142, 148 are illustrated in FIG. 1 as logically associated with a network computing provider 107, the NCC POPs will be geographically distributed throughout the communication network 108 in a manner to best serve various demographics of client computing devices 102. Additionally, one skilled in the relevant art will appreciate that the network computing provider 107 can be associated with various additional computing resources, such additional computing devices for administration of content and resources, and the like. Even further, one skilled in the relevant art will appreciate that the components of the network computing provider 107 and components of the CDN service provider 106 can be managed by the same or different entities.

With reference now to FIGS. 2-6, the interaction between various components of the networked computing environment 100 of FIG. 1 will be illustrated. Specifically, FIGS. 2-6 illustrate the interaction between various components of the networked computing environment 100 for the exchange of content between a client computing device 102 and a content provider 104 via the network computing provider 107. For purposes of the example, the illustrations have been simplified such that many of the components utilized to facilitate communications are not shown. One skilled in the relevant art will appreciate that such components can be utilized and that additional interactions would accordingly occur without departing from the spirit and scope of the present disclosure.

Figure 2:
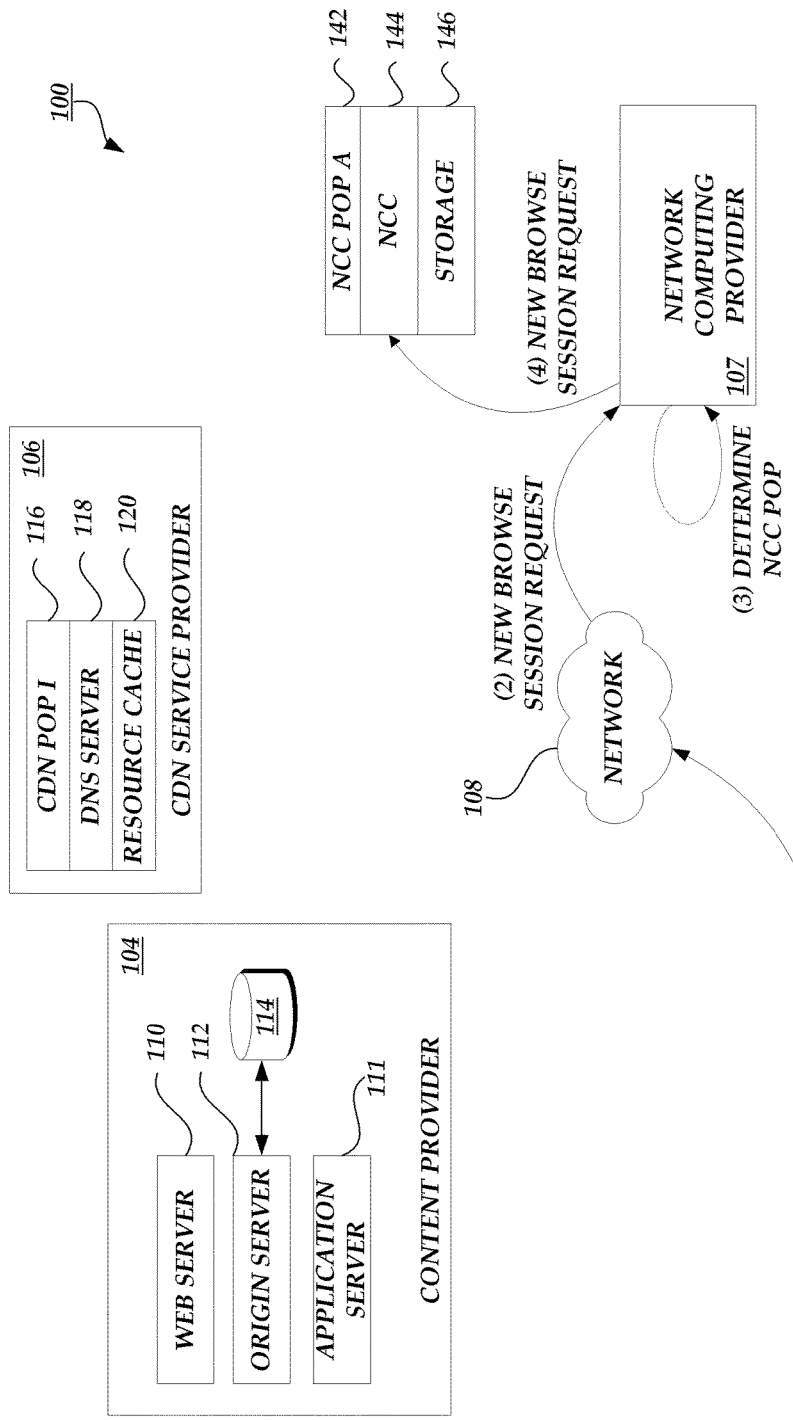
FIG. 2 is a block diagram of the content delivery environment of FIG. 1 illustrating the generation and processing of a new browse session request from a client computing device to a network computing provider.

With reference to FIG. 2, the process can begin with the generation and processing of a browse session request from a client computing device 102 to a network computing provider 107 will be described. Illustratively, the client computing device 102 may load a browser for viewing network content in response to an event or user request. Subsequent to the browser being loaded, the browser may be implemented to request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. As illustrated in FIG. 2, the browse session request is transmitted first to a network computing provider 107. In an illustrative embodiment, the network computing provider 107 utilizes a registration application program interface ("API") to accept browse session requests from the client computing device 102. The browse session request can include network address information corresponding to a requested network resource, which may be in any form, including, but not limited to, an Internet Protocol ("IP") address, a URL, a Media Access Control ("MAC") address, etc.

Subsequent to the receipt of the browse session request, the network computing provider 107 may select an associated network computing component (hereinafter "NCC") point of presence (hereinafter "POP") such as NCC POP 142 to service the browse session request. The selection of the NCC POP may determine the processing and network resources available to the instantiated virtual machine. The selection of processing and network resources and the provisioning of software at the NCC POP instance may be done, at least in part, in order to optimize communication with content providers 104 and client computing devices 102. As illustrated in FIG. 2, the identification data received with the browse session request can be passed to the NCC POP instance servicing the browse session request.

Figure 3:
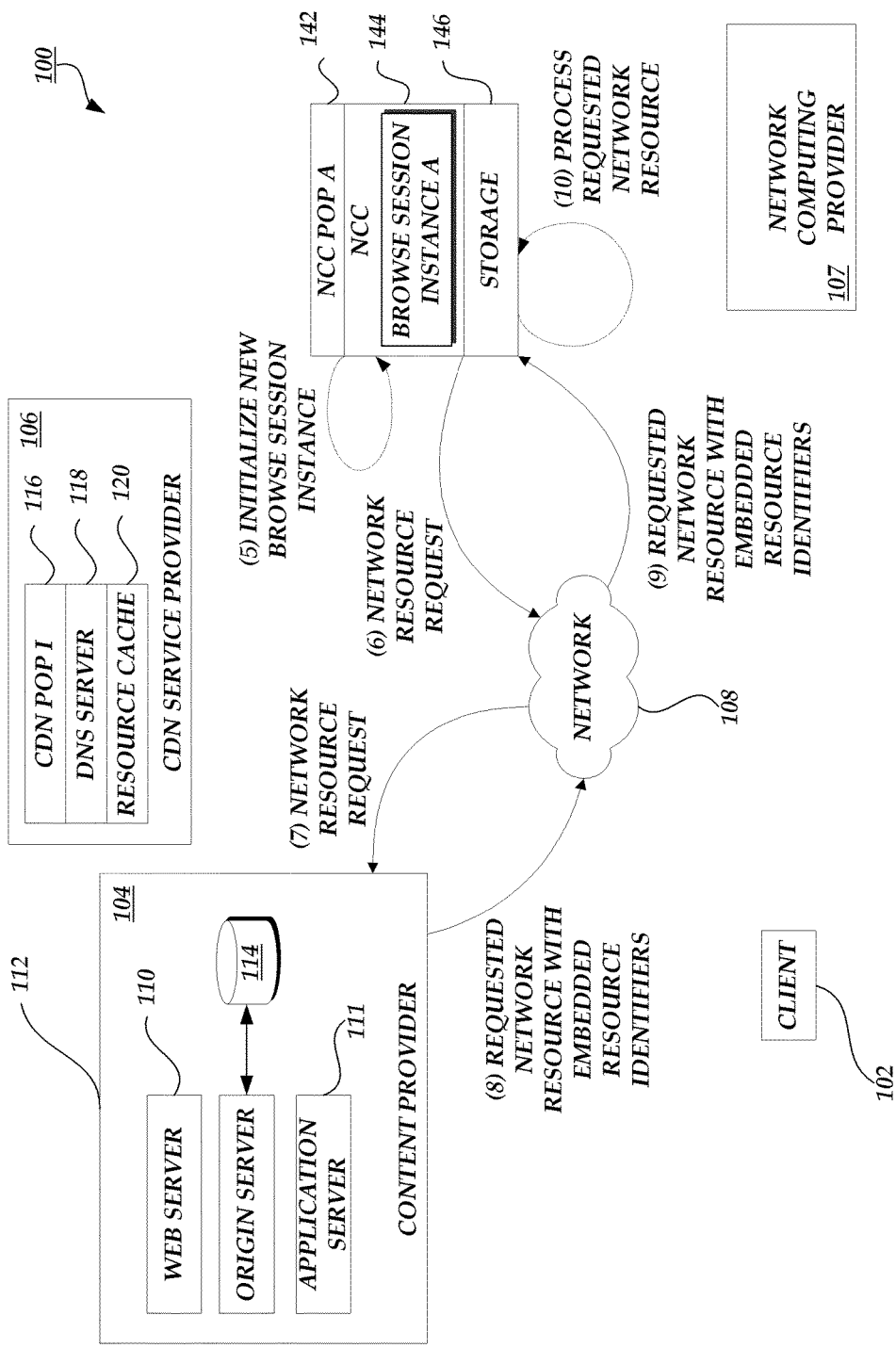
FIG. 3 is a block diagram of the content delivery environment of FIG. 1 illustrating the generation and processing of a request for a network resource from a network computing provider to a content provider.

With reference to FIG. 3, an illustrative interaction for generation and processing of a request for a network resource from a network computing provider 107 to a content provider 104 will be described. As illustrated in FIG. 3, the selected NCC POP 142 may generate a browse session corresponding to one or more content providers based on a browse session request, such as the illustrative browse session request depicted in FIG. 2 above. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session.

Subsequent to initializing a new browse session instance, NCC POP 142 may provide a request for a network resource to a content provider 104 based on a network address included in the browse session request. For example, a browse session request may include a URL for a Web page, such as "http://www.xyzsite.com/default.htm." NCC POP 142 may resolve the URL to an IP address through a DNS resolver associated with the network computing provider (not shown), and may request the Web page from the content provider 104 at the resolved IP address. In various embodiments, a network resource may be retrieved from any combination of content providers, content delivery network (hereinafter "CDN") servers, or caches associated with the network computing provider 107. For example, the network computing provider may check if a resource is stored in a local cache or in another server or service provider associated with the network computing provider 107. If a network resource is stored in a local or associated location, the NCC POP 142 may retrieve the network resource from the local or associated location rather than from the third party content provider 104 or CDN service provider 106. Illustratively, the NCC POP 142 may provide requests for any number of network resources as included in the browse session request, and may obtain these network resources from any number of different sources, sequentially or in parallel.

As illustrated in FIG. 3, the content provider 104 receives the resource request from the NCC POP 142 and processes the request accordingly. In one embodiment, the content provider 104 processes the resource request as if it were originally provided by the client computing device 102. For example, the content provider 104 may select the type of content, ordering of content, or version of content according to the requirements of the requesting client computing device 102. In another embodiment, the content provider 104 may be provided with information that provides information associated with the NCC POP 142 for utilization in providing the requested content (e.g., an available amount of processing resources or network bandwidth).

Subsequent to obtaining the requested network resource from the content provider 104 (or other source designated by the content provider), the NCC POP 142 may process the network resource to extract embedded resource identifiers and gather information for determination of a remote session browsing configuration. For example, a network resource such as a Web page may include embedded CSS style information and JavaScript as well as embedded resource identifiers to additional resources such as text, images, video, audio, animation, executable code, and other HTML, CSS, and JavaScript files. In the process of extracting the embedded resource identifiers, the NCC POP 142 may gather information about the processed network resources for later use in the determination of a remote session browsing configuration as discussed below with reference to FIG. 4.

Figure 4:
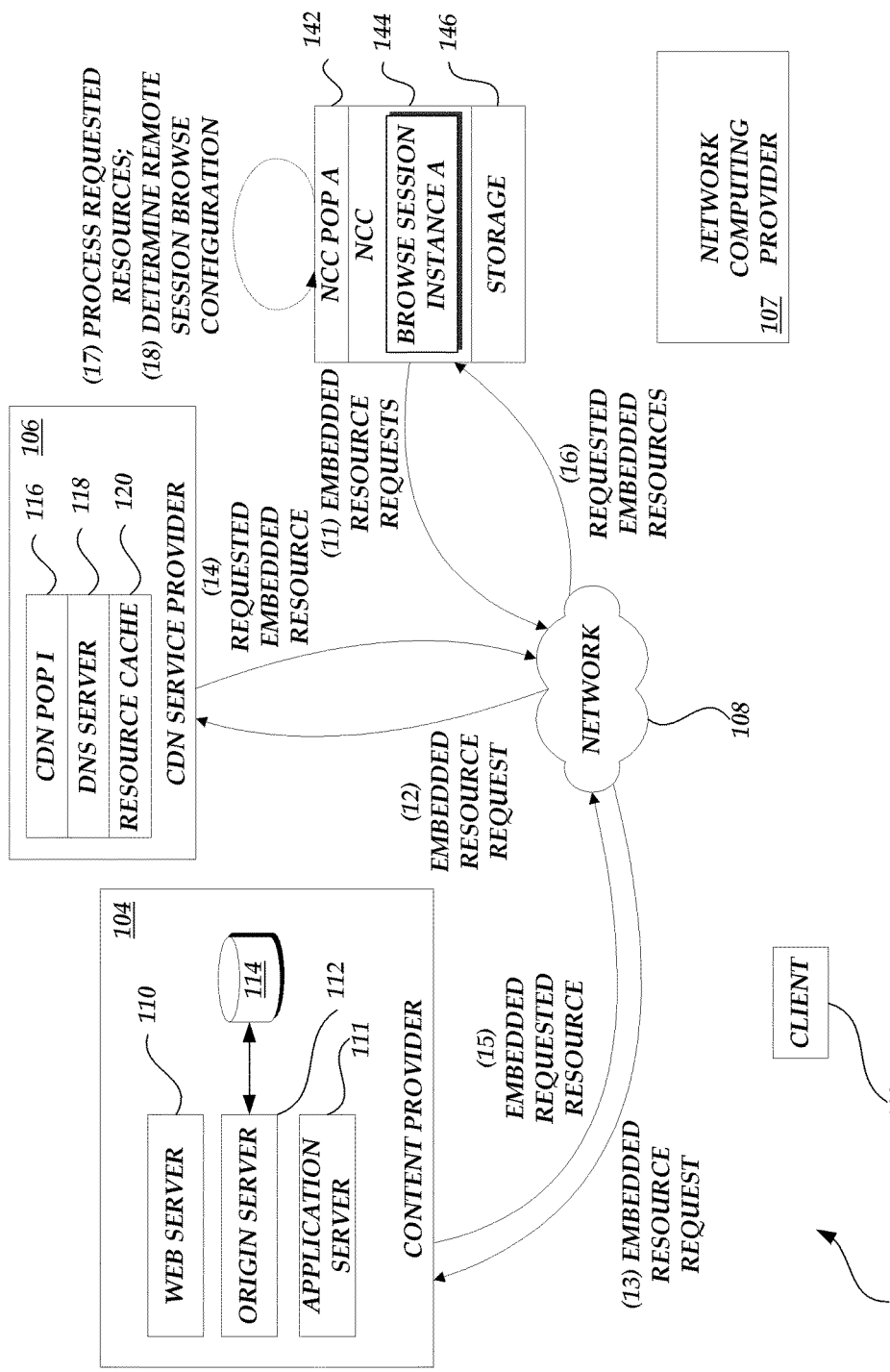
FIG. 4 is a block diagram of the content delivery environment of FIG. 1 illustrating the generation and processing of one or more requests corresponding to one or more embedded resources from a network computing provider to a content provider and content delivery network.

With reference to FIG. 4, an illustrative interaction for generation and processing of one or more requests corresponding to one or more embedded resources from a network computing provider to a content provider and content delivery network is disclosed. As illustrated in FIG. 4, the selected NCC POP 142 may provide resource requests to one or more sources of content such as content provider 104 and CDN POP 116. The resource requests may correspond to embedded resources based on one or more embedded resource identifiers extracted from a requested network resource (e.g., a Web page) as described in FIG. 3 above. In various embodiments, embedded resources may be retrieved from any combination of content providers, CDN servers, or caches associated with the network computing provider 107. For example, the network computing provider may check if an embedded resource is stored in a local cache or in another server or service provider associated with the network computing provider 107. If an embedded resource is stored in a local or associated location, the NCC POP 142 may retrieve the embedded resource from the local or associated location rather than the third party content provider or CDN. Illustratively, the NCC POP 142 may provide requests for any number of embedded resources referenced by a network resource, and may obtain these embedded resources from any number of different sources, sequentially or in parallel. Subsequent to obtaining the requested resources, the NCC POP 142 may process the resources and requested content to determine a remote session browsing configuration for the processing and communication of content to the client computing device 102.

Figure 5:
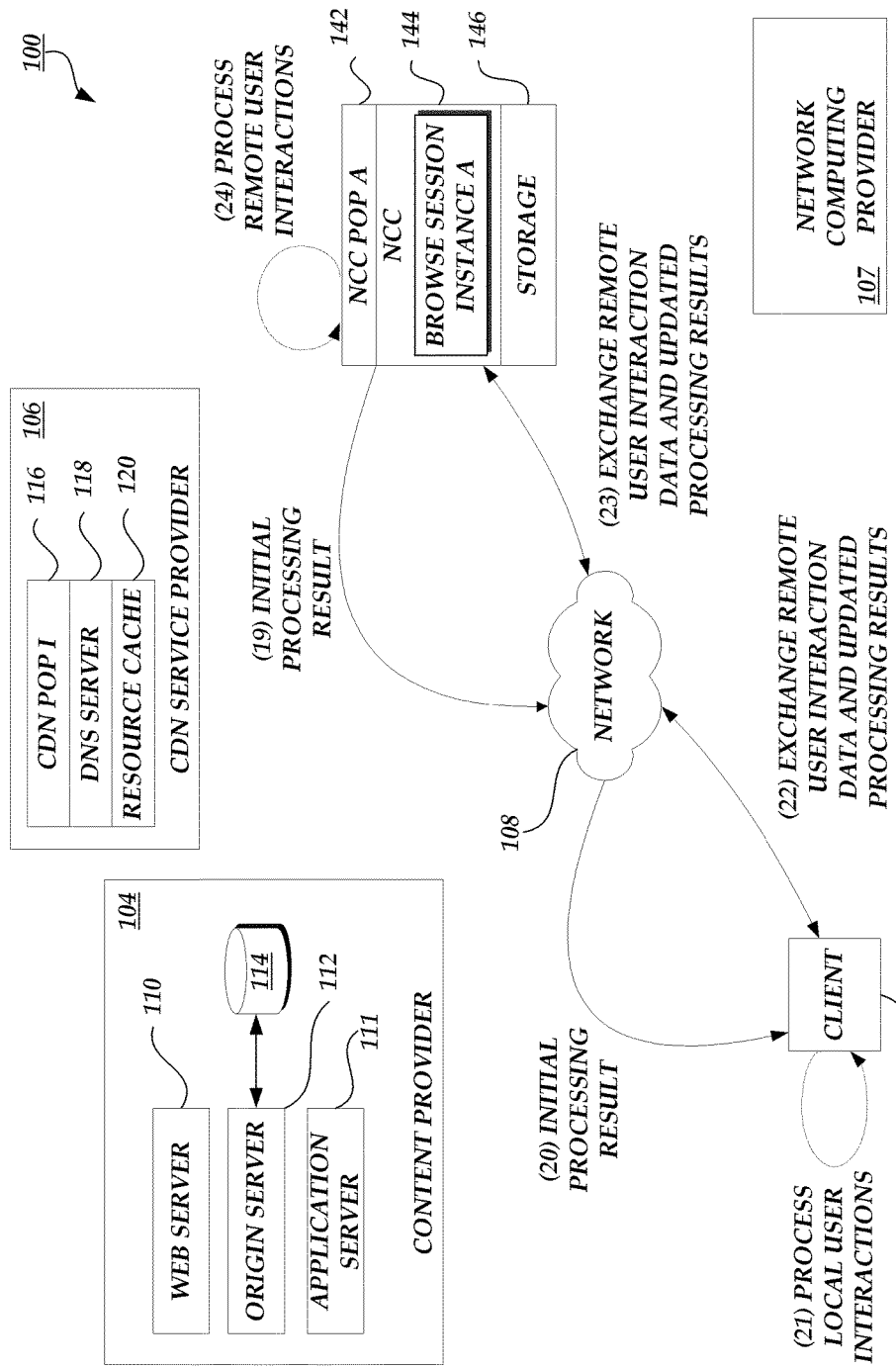
FIG. 5 is a block diagram of the content delivery environment of FIG. 1 illustrating the generation and processing of browse session data and user interaction data between a network computing provider and client computing device.

With reference to FIG. 5, an illustrative interaction for generation and processing of processing results and user interaction data between a network computing provider and client computing device is disclosed. As previously described, in one embodiment, the respective browsers on the instantiated network computing component and the client computing device 102 can exchange browsers' session information related to the allocation and processing of the requested resources at the instantiated network computing component and client computing device. As illustrated in FIG. 5, the selected NCC POP 142 may provide an initial processing result to the client computing device 102 over the network 108. The initial processing result may correspond to requested network content, such as a Web page, along with associated embedded resources processed by the NCC POP 142 in accordance with a selected remote session browsing configuration as described in FIG. 4 above. The NCC POP 142 also makes a determination of which additional processes will be conducted at the NCC POP 142, at the client computing device 102, or both, as illustrated in FIG. 5. Subsequent to receiving an initial processing result and the allocation of processes, the client computing device 102 may perform any remaining processing actions on the initial processing result as required by the selected remote session browsing configuration, and may display the fully processed content in a content display area of a browser. The client computing device 102 may process any local user interactions with local interface components or content elements locally, and may provide user interactions requiring remote processing to the network computing provider 107. The network computing provider 107 may provide updated processing results to the client computing device 102 in response to changes to the content or remote user interaction data from the client computing device 102.

The browser session information may also contain selections of content items by the user of the client computing device 102. The user may select a portion of a received web page in order that the selection may be added to the user's composite page. In some embodiments, the user may select an individual content item, such as stock ticker, calendar, or weather forecast. For example, the display coordinates of the content item, an HTML tag encompassing the content item, or any appropriate indicator from which the NCC can determine which content item has been selected may be used. In some embodiments, the user may select a web page in its entirety, or may select a web page for the NCC to determine the most appropriate content item to include in the user's composite page. Information about the selection may be transmitted to the NCC. In some embodiments, a user may configure the layout, update schedule, and other settings for the user's composite page or pages, and such data can also be transmitted from the client computing device 102 to the NCC.

Figure 6:
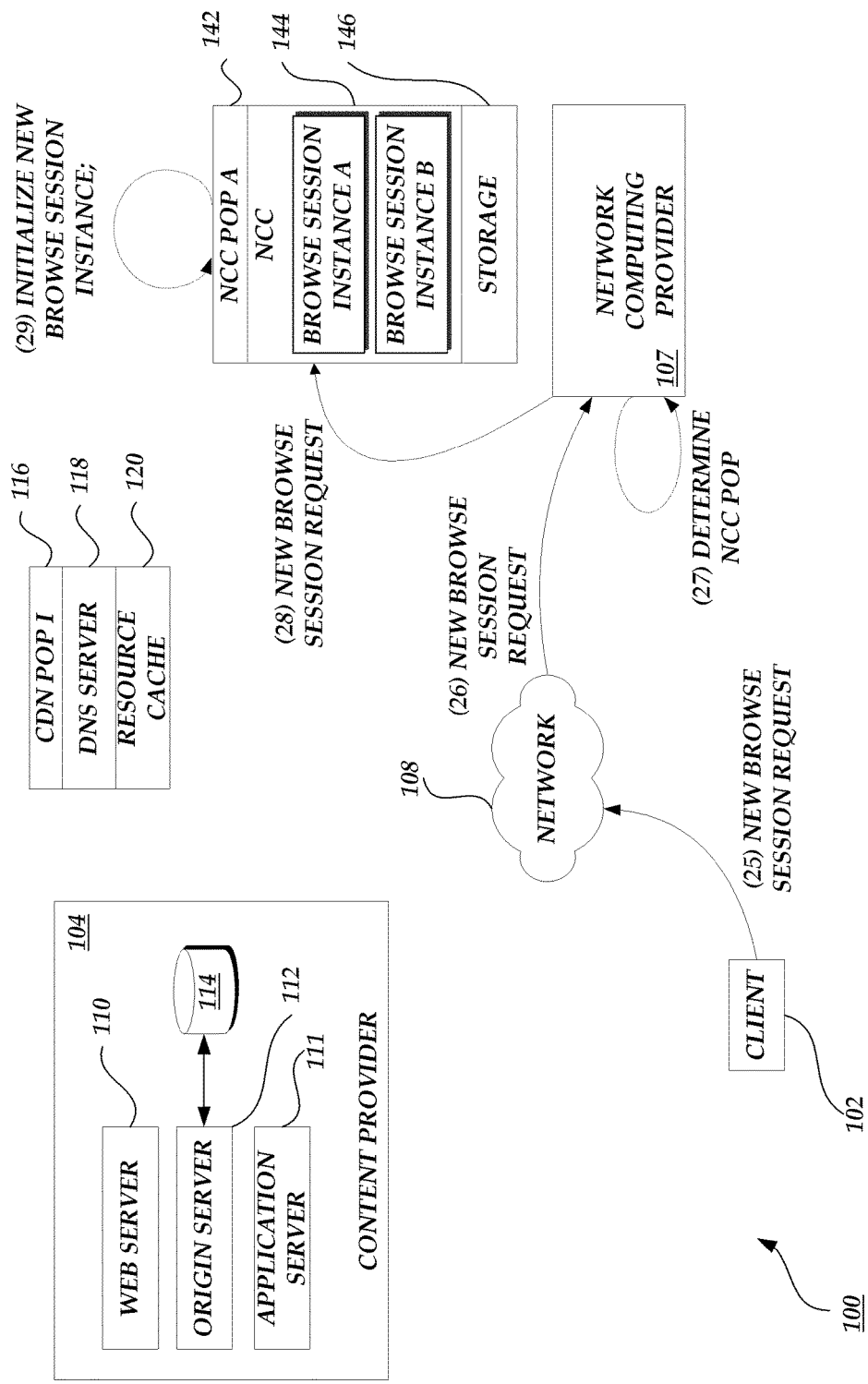
FIG. 6 is a block diagram of the content delivery environment of FIG. 1 illustrating the generation and processing of an additional new browse session request from a client computing device to a network computing provider.

With reference to FIG. 6, a block diagram of the content delivery environment of FIG. 1 illustrating the generation and processing of an additional new browse session request from a client computing device to a network computing provider is disclosed. As illustrated in FIG. 6, a second new browse session request may be sent to network computing provider 107 from client computing device 102 across network 108. In an illustrative embodiment, the network computing provider 107 utilizes a registration API to accept browse session requests from the client computing device 102.

The additional browse session request may be generated by a client computing device 102 in response to a user opening up a new browser window with a new content display area, opening a new content display area in an existing browser window (e.g., opening a new tab in a browser), requesting new network content in an existing content display area (e.g., following a link to a new network resource, or entering a new network address into the browser), requesting the user's composite page, or any other user interaction. For example, a user browsing a first Web page corresponding to a first browse session instance may follow a link that opens a new tab or browser window to view a second Web page. In one embodiment, any required steps of obtaining and processing content associated with the second Web page may be performed by the currently instantiated network computing component in which the browser can handle the processing of both resource requests. In another embodiment, the client computing device 102 request may be processed as a new browse session request to the network computing provider 107, including the network address of the second Web page. In this embodiment, the browser on the client computing device may not specifically request a separate browse session, and a user's interaction with the browser on the client computing device 102 may appear to be part of a same browsing session. As described above with regard to FIGS. 2 and 3, the network computing provider 107 may cause an instantiation of a network computing component for obtaining and processing content associated with the second web page. In other embodiments, a new browse session request may be generated by the client computing device 102 corresponding to sections of a network resource (e.g., frames of a Web page), individual network resources, or embedded resources themselves, data objects included in a set of content, or individual network resources.

Illustratively, the additional browse session request may include any number of pieces of data or information including, but not limited to, information associated with a user, information associated with the client computing device 102 (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. Requested content may include any manner of digital content, including Web pages or other documents, text, images, video, audio, executable scripts or code, or any other type of digital resource.

As illustrated in FIG. 6, subsequent to the receipt of the browse session request the network computing provider 107 may select an associated network computing component such as NCC POP 142 to service the browse session request. As discussed above with reference to FIG. 2, a network computing provider 107 may select an NCC POP to service a browse session request based on any number of factors, including, but not limited to available NCC POP resources (e.g., available memory, processor load, network load, etc), a financial cost of servicing the browse session request at the NCC POP, the NCC POP location respective to a client computing device 102, content provider 112, or CDN POP 116, a NCC POP cache status (e.g., whether a requested resource is already stored in an NCC POP cache), etc. In one embodiment, the network computing provider 107 may select a number of NCC POPs to service a browse session request. Illustratively, although the network computing provider 107 is depicted here for purposes of illustration as selecting NCC POP 142, the network computing provider 107 may select any extant NCC POP to service the browse session request. For example, a single client computing device 102 may simultaneously or sequentially provide three different browse session requests to the network computing provider 107 corresponding to different network resources. The network computing provider 107 may select different NCC POPs for each browse session request, the same NCC POP for all three browse session requests, or any combination thereof. As discussed above, the decision whether to select a different NCC POP than was utilized for a previous or simultaneous browse session request may be made on the basis of available system resources, randomly, or according to any other factor as discussed above and with regards to FIG. 2.

When the additional browse session request is a request for a user's composite content page, the NCC can launch any number of browser instances to response to the request. In some embodiments, the NCC may launch a single browser instance, and within that browser instance simultaneously retrieve and process the various web pages which contain selected content items, rendering them directly into the composite content page. Such a configuration may conserve memory and certain other resources of the NCC, but may increase the risk of cross-site scripting and other security issues. In some embodiments, the NCC may launch a single browser instance, and serially retrieve and process each web page that contains a selected item. Such a configuration can reduce the risk of security issues such as cross-site scripting, but may result in unsatisfactory performance, as experienced by a user, due to the amount of time it may take to retrieve and process each web page serially. In some embodiments, the NCC may launch a separate browser instance for each content item. In such a case, the web page that contains each item can be retrieved and processed in separate browser instance within the NCC. In some embodiments, the browser instances may be spread across two or more NCCs, as determined by the network computing provider 107 in an effort to balance the needs for security and processing speed. In these multiple-browser configurations, the risk of cross-site scripting and other attacks is reduced. When the network computing provider 107 is configured with a large amount of computing capacity and bandwidth, the benefits of using multiple-browser configurations can be realized while maintaining or even improving overall processing time and user experience.

Figure 7A:
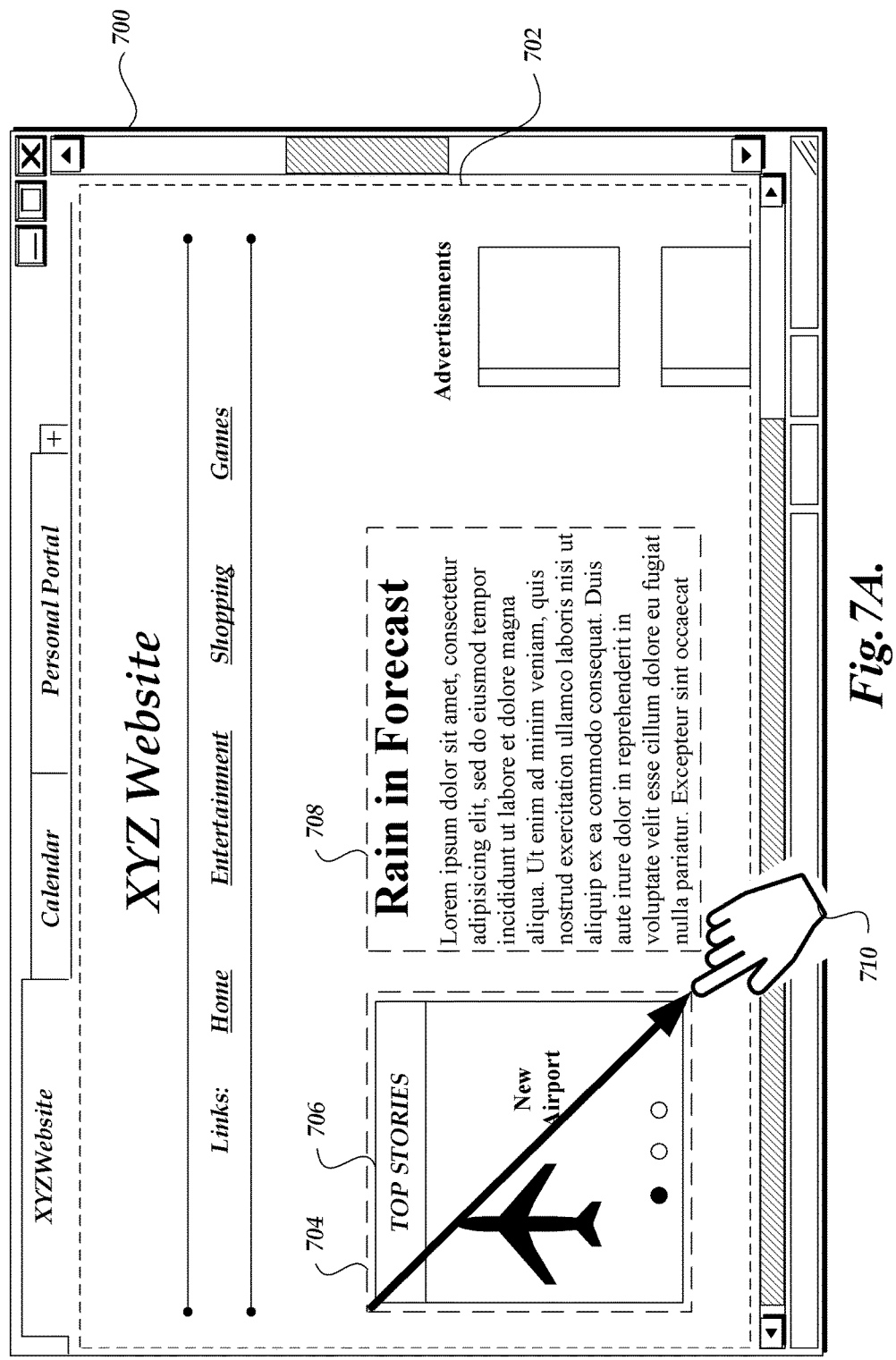
FIG. 7A is a user interface diagram depicting an illustrative browser interface displaying browse session content and selection of a content item by a user.

FIG. 7A is a user interface diagram depicting an illustrative browser interface and display of browse session content. As described above with reference to FIG. 5, a browser 700 may have a content display area 702, as well as one or more one or more local interface components. These local interface components may include toolbars, menus, buttons, address bars, scroll bars, window resize controls, or any other user interface controls. Illustratively, local interface components may be displayed as separate from the content display area 702 or may be overlaid or embedded in the content display area 702.

Interactions with local interface components may be treated as local user interactions or remote user interactions depending on the processing required by the interaction and the remote session browsing configuration. For example, the selection of a preferences option in a browser menu may be handled entirely as a local user interaction by a browser. The processing required to display the menu, provide visual feedback regarding the selection, display the preferences window, and process the changes made to the browser preferences may be performed locally. As discussed above, processing user interactions locally may provide greater responsiveness at the browser as opposed to sending user interaction data to the NCC POP 142 for processing. As another example, when using a remote session browsing configuration that specifies extensive processing on the NCC POP 142 (e.g., a remote session browsing configuration using a remote session communication protocol such as RDP), the selection of a content refresh button in a browser toolbar may be handled both as a local user interaction and a remote user interaction. The limited processing required to provide interface feedback corresponding to the button selection may be handled at the client computing device 102 in order to provide the appearance of interface responsiveness, while the refresh command, which may require processing of the network content displayed in the content display area of the browser, may be sent as user interaction data to the NCC POP 142 for processing. The NCC POP 142 may then transmit updated processing results corresponding to the refreshed network content back to the client computing device 102 for display.

Additionally, user interaction occurring at the browser 700 can include selection of content items for inclusion in a user's composite page. As illustrated in FIG. 7A, a web page may contain any number of individual content items. For example, a top stories item 706 of a news web page may be a dynamic object embedded within the web page. The top stories item 706 may rotate stories periodically, and may add, edit, and remove stories over time. An individual story item 708 of a news web page may contain what appears to be static text, but is actually a dynamically generated content object that may change each time the web page is visited. A user can select either or both of these content items for inclusion in the user's composite page. For example, if a user is operating a client computing device 102 with a touch screen display, the user may perform a tap and drag gesture 710, or some other appropriate touch screen input, to select a content item. As shown in FIG. 7A, the user has created a selection area 704 around the top stories item 706 by tapping in the area generally corresponding to the upper left hand corner of the top stories item 706 and dragging a finger to the area generally corresponding to the lower right hand corner of the top stories item 706. In some embodiments, the user may use a mouse to click and drag a selection area 704 around the top stories item 706. In some embodiments, the user may use other input methods or devices, such as a digital pen, a voice command, a menu or toolbar command, or eye movements if the client computing device 102 is configured with a camera. In some embodiments, the NCC may determine which portions of a web page are likely to be selected for inclusion in a composite page, and may encode the web page that it sends to the client computing device 102 with information which the browser can use to highlight content items for selection.

Figure 7B:
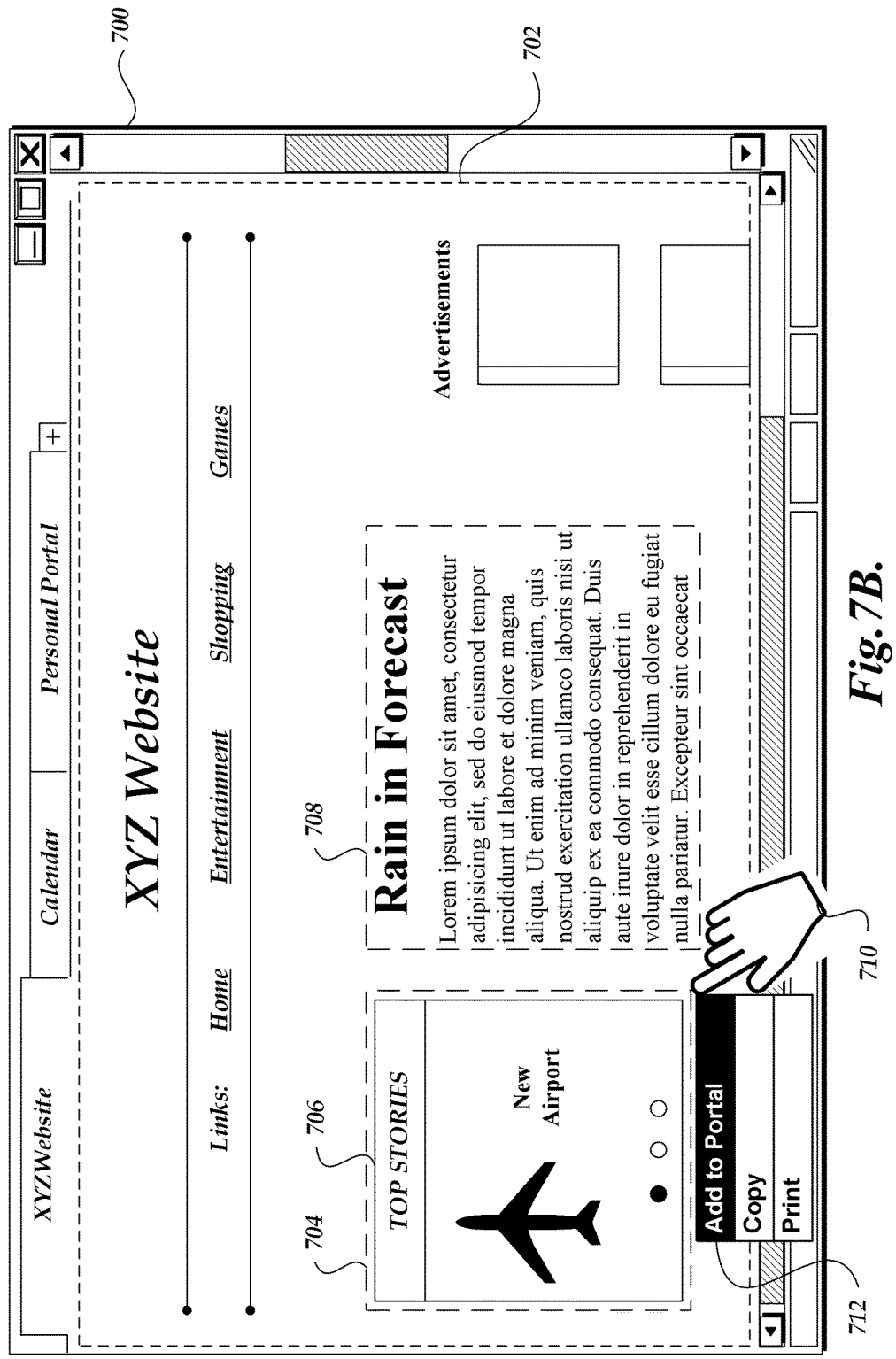
FIG. 7B is the user interface diagram of FIG. 7A depicting a context menu for selecting content item for addition to a composite content page.

FIG. 7B illustrates the user interface 700 of FIG. 7A displaying the same news web page. The state illustrated in FIG. 7B may arise when a user has selected a content item, such as by dragging a selection area 704 around the top stories content item 706. Upon completion of the tap and drag gesture 710 of FIG. 7A, a context-sensitive popup menu 712 may be displayed, as illustrated in FIG. 7B. The menu 712 can provide a user with various actions to perform on the selection area 704, such as adding the content item within the selection area 704 to the user's composite page. In some embodiments, a context-sensitive popup menu 712 may be replaced by a toolbar, a standard menu, a hovering input control such as a link or a button, etc. If a user activates the option for adding the content item within the selection area 704 to the user's portal or composite page, data can be transmitted to the NCC.

Activating the option to add the top stories content item 706 to the user's content page can cause the browser to determine which area of the display is within the selection area 704. In some embodiments, the browser may determine an identifier for the content item prior to displaying the option to add it to the user's composite page. The browser may use display coordinates, HTML tags, or other content item indicators in order to determine which content item has been selected. In this example, the browser can then transmit, to the NCC, the data that identifies the top stories item 706. In some embodiments, the browser may transmit a copy of the selection area 704 for analysis by the NCC. The data transmitted to the NCC can be stored in an electronic data store for future retrieval and analysis. For example, if a user drags a selection area 704 around a top stories item 706, as shown in FIG. 7A, and then activates a menu option 712 to add the item to the user's composite page, the NCC can store the content item identifier, as determined by either the client computing device 102 or the NCC, along with information about the user, such as the user's account number or some unique identifier assigned to the user or client computing device 102. The information about the content item may include the network address of the source web page so that the NCC can retrieve the page in the future when processing requests for composite pages.

Figure 7C:
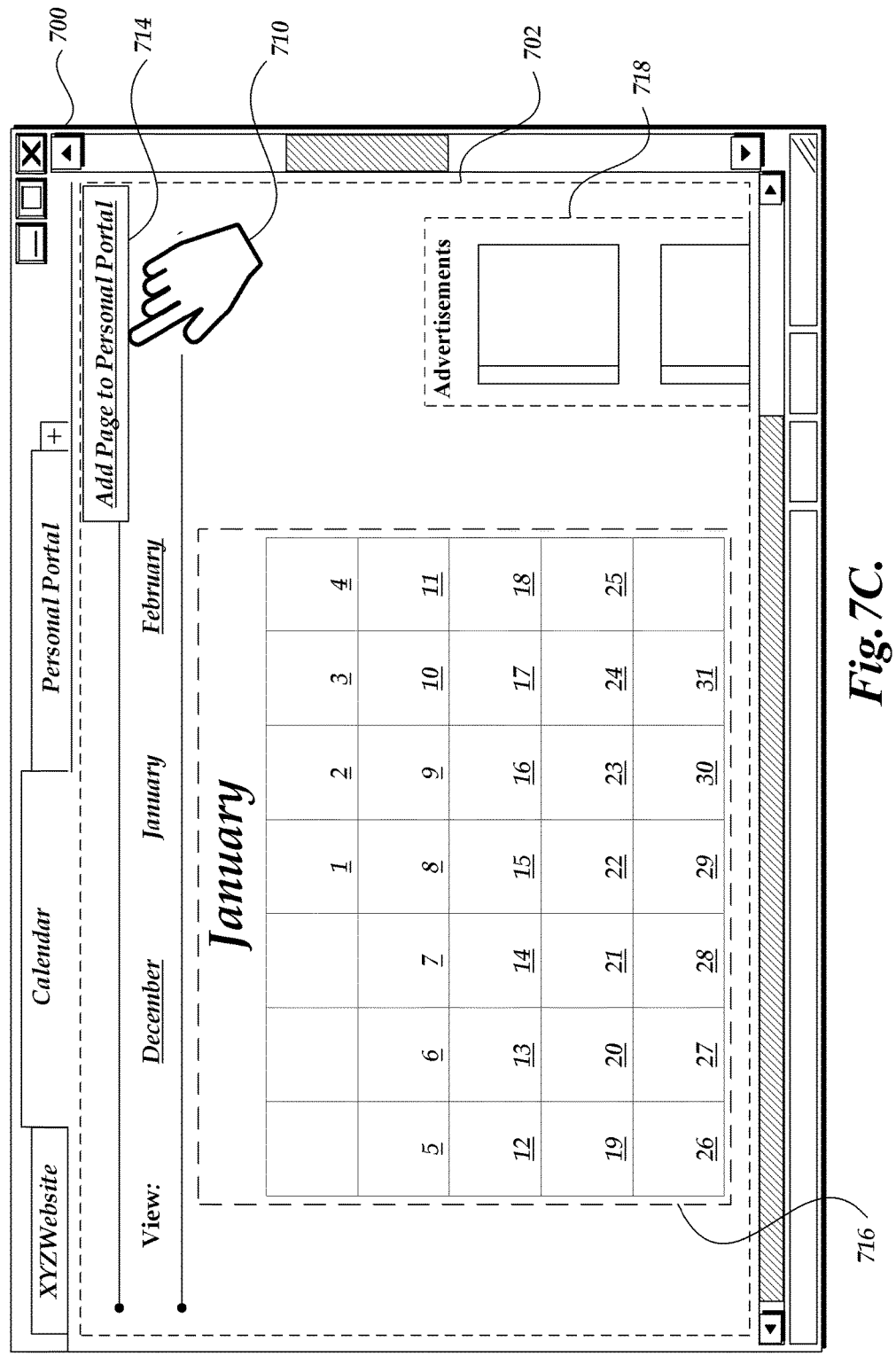
FIG. 7C is a user interface diagram depicting an illustrative browser interface displaying browse session content with an interactive control for selecting a content item.

FIG. 7C illustrates the news web site of FIGS. 7A and 7B, with an input control 714 which allows a user to add an entire web page to the user's composite page. The input control 714 may be displayed in addition to, or instead of, the context sensitive popup menu 712 and the other controls described above with respect to FIG. 7B. In response to a user activating the input control 714 of FIG. 7C, the browser can transmit data to the NCC indicating that the user has added the entire web page to the user's composite page. When the NCC proceeds to generate the user's composite page, the NCC can retrieve the entire web page that the user selected by activating the input control 714. The NCC may perform some processing on the page prior to including it in the composite page. For example, the NCC may remove advertisements 718 and/or other low-interest or objectionable items.

In some embodiments, the input control 714 can be used to automatically select the most likely content item on the page for addition to the user's composite page. For example, activation of the input control 714 may cause the browser to transmit data to the NCC, which then determines which portion of the page to add to the user's composite page based on previous selections. In some embodiments, the NCC can base the determination in part on previous selections of other users interacting with the web page. For example, when a user may either use the input control 714 or a selection area, as described above with respect to FIG. 7B, the NCC can analyze which content item of the web page is most often selected using the selection area method. When a determination is made, the NCC can default the selection for the web page to that content item. Thereafter, when a user activates the input control 714, the default content item can be added to the user's composite page. In some embodiments, the NCC can personalize the determination of default items for individual users. For example, the NCC can analyze the user's own selection history to determine which item to use as the default content item. Therefore, if a user typically adds calendars from web pages to the user's composite page, the NCC may determine that the calendar item 716 illustrated in FIG. 7C is the default item to add to a user's composite page in response to the user activating the input control 714.

Figure 7D:
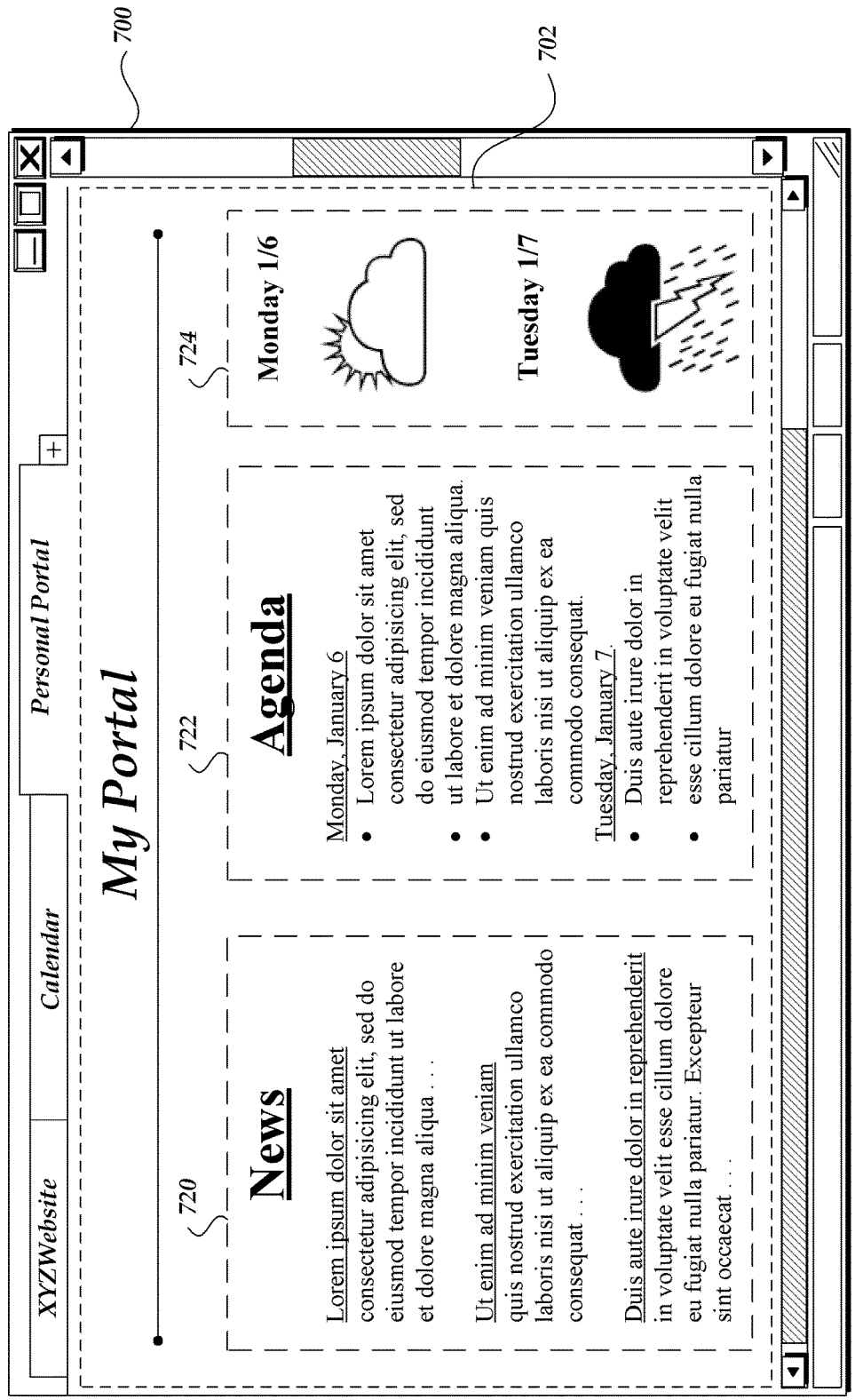
FIG. 7D is a user interface diagram depicting an illustrative composite content page with user-selected content items from different web sites.

FIG. 7D illustrates an example of a user's composite page. The composite page illustrated in FIG. 7D includes only the text of certain content items, such as news item 720 and agenda item 722. Additionally, the composite page may include only images of certain content items, such as the weather item 724. In some embodiments, the NCC may determine the most appropriate representation for each content item. For example, the NCC may determine that some content items are primarily text based, such as news stories, and therefore may be simplified into exclusively text for display on the composite page. Other items, such as the weather, may be easily summarized with an image, and in many cases the image may be available on the source web page. Removing extraneous images, text, and the like can simplify the presentation of the composite page to the user. In addition, it can serve to reduce the risk of certain security issues, such as cross site scripting as described in detail below.

Figure 7E:
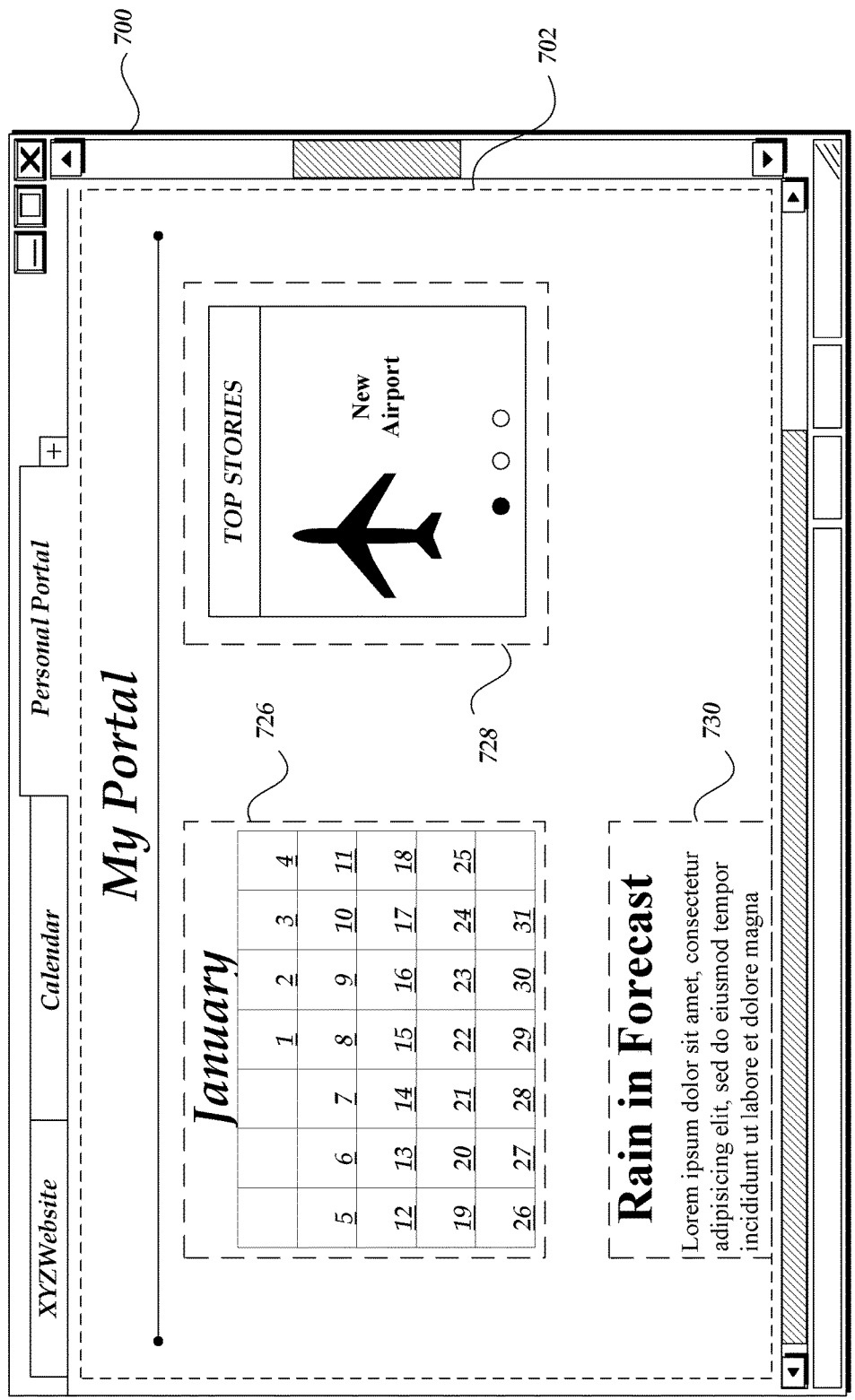
FIG. 7E is a user interface diagram depicting an illustrative composite content page with selected content items from various web sites.

FIG. 7E illustrates another example of a user's composite page. The composite page illustrated in FIG. 7E includes accurate representations of how each content item appeared on the source web page. For example, the calendar item 726 corresponds to the calendar 716 of FIG. 7C, the top stories item 728 corresponds to the top stories item 706 in the selected portion 704 of FIG. 7A, and the news story item 730 corresponds to the individual news story item 708 of FIG. 7A. In some embodiments, the representations of content displayed in composite pages such as the composite page of FIG. 7E may be static images of the rendered content item from the source web page. Using static images can provide the user with a faithful reproduction of how each content item looks on the corresponding source web page, while also providing a measure of safety against security risks. In some embodiments, the representations may be more than just visually faithful to the corresponding source web pages; they may be copies of the content item, including a portion of the source code such as HTML, from the corresponding source web page. The copies may therefore preserve any interactive features of the source web page. For example, such a copy of a textual content item may allow users to highlight and copy text to a clipboard, as users may normally do with viewing text-based content in browsers. In another example, a copy of an applet may allow user input and processing as though the applet were still hosted by the source web page. In order to provide safety against security risks, the underlying source code, whether HTML, JavaScript, or some other programming language, may be sanitized to reduce security risks as described below.

In some embodiments, the content items can each be loaded into a series of browser tabs, rather than combined into a composite page. For example, each content item can be loaded into a separate tab, or content items can be grouped into tabs, with each tab combining the content items in a manner similar to the composite pages described above.

In some embodiments, users may configure the overall layout of the composite page or how each content item is to be represented. For example, a user may access a customization page, hosted by the network computing provider 107, which provides the user with interactive tools to customize the user's composite page. The user may move the various content items around on the page, arrange them into groups, and configure how each content item is represented. A user may configure the composite page to include textual representation of news and other article-based content items, while preserving the interactivity of an applet such as a stock market ticker. Alternatively, the customization may be performed as part of a user interface provided by the browser, or provided by the network computing provider 107 in a remote desktop mode. In some embodiments, the NCC may automatically determine a layout and other configuration settings for the composite page, or the user may have templates upon which to build a composite page.

Figure 8:
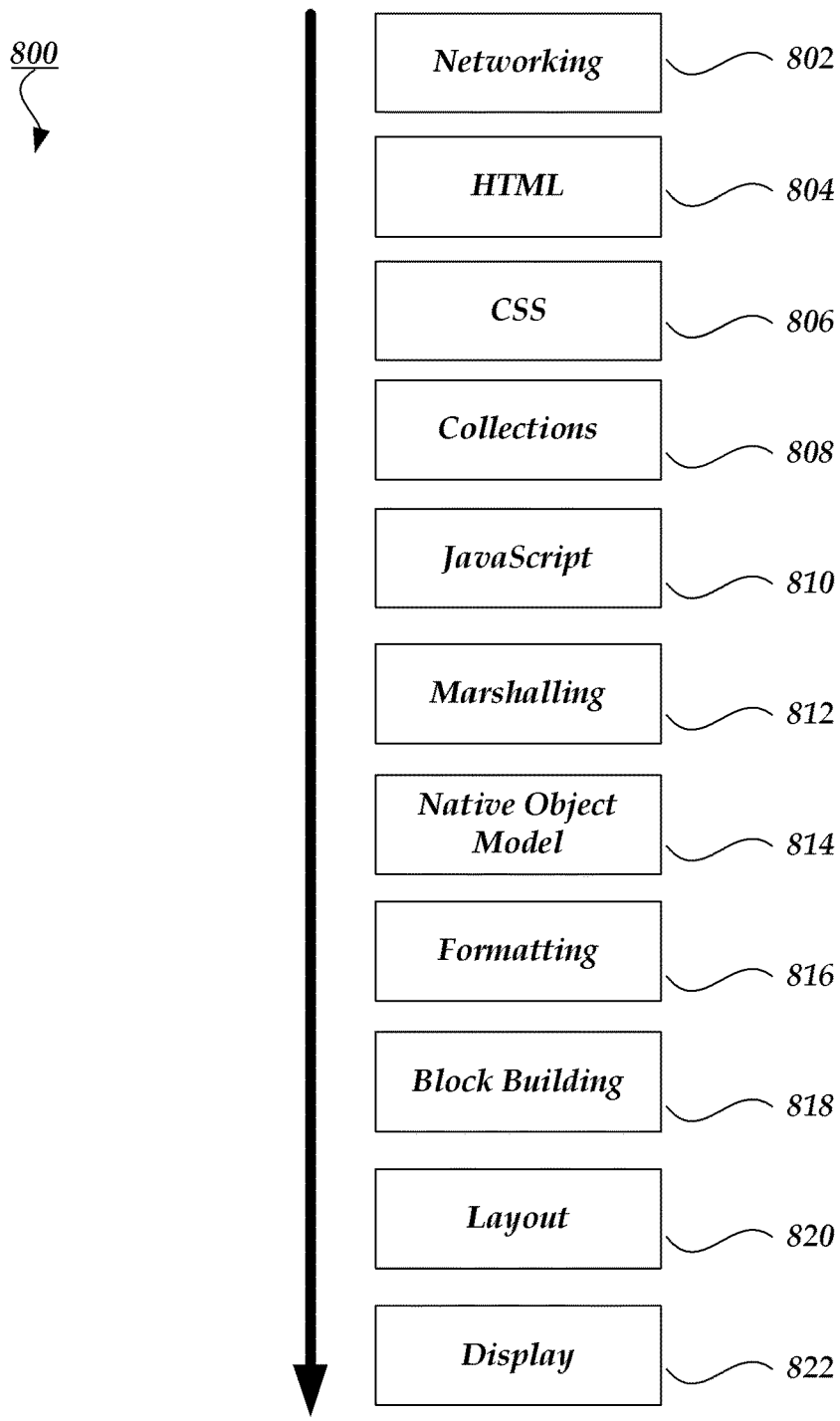
FIG. 8 is a diagram depicting illustrative browser content processing actions as a series of processing subsystems.

FIG. 8 is a diagram depicting illustrative browser content processing actions as a series of processing subsystems 800. In many embodiments, a browser may process sets of content (e.g., network resources such as web pages and associated embedded resources) in a series of processing actions. Illustratively, and as described above with reference to FIGS. 3-5, a remote session browsing configuration may specify a split between processing actions performed at a network computing provider (e.g., an NCC POP) and processing actions performed at a client computing device 102. This split may designate some processing actions to be performed by each of the NCC POP and client computing device 102, or may assign all processing actions to a single device or component. For example, an NCC POP may perform all of these various processing actions at the browse session instance, and send fully processed RDP processing results to the client computing device 102 for bitmap assembly and display. Any number of different remote session browsing configurations may be used by one or more browse sessions instances running at an NCC POP.

One of skill in the relevant art will appreciate that the subsystems shown here are depicted for the purpose of illustration, and are not intended to describe a necessary order or a definitive list of browser subsystems. Various browser software components may implement additional or fewer browser subsystems than are shown here, and may order the subsystems or corresponding processing actions in any number of different ways. Although the processing subsystems 800 depicted here for purposes of illustration are directed at the processing of Web pages or other Web content, one of skill in the relevant art will appreciate that the processing of other file types or network resources may be broken up in a similar manner. For example, one of skill in the relevant art will appreciate that a similar schema may be developed for the processing of images, video, audio, database information, 3d design data, or any other file format or type of data known in the art. Similar schema may also be developed for any number of device operating system or software framework processing operations, such as scheduling, memory or file management, system resource management, process or service execution or management, etc. Further, although the HTML protocol and RDP remote session communication protocols are discussed herein for the purposes of example, one of skill in the relevant art will appreciate that a remote session browsing configuration may implement any number of remote communication protocols for any number of specified processing actions, and that a remote session browsing configuration may be formulated to perform any fraction or combination of the actions identified below at any combination of the client computing device 102 and network computing provider 107.

Illustratively, the first processing subsystem involved in the processing and display of network content is the networking subsystem 802. Illustratively, the networking subsystem 802 may be responsible for all communication between the browser and content provider, including local caching of Web content. The networking subsystem is generally limited by the performance of the user's network.

A remote session browsing configuration that splits processing actions at the networking subsystem 802 might include a remote session browsing configuration utilizing an HTML remote session communication protocol, where one or more caching or resource retrieval actions were performed at the NCC POP, but parsing and processing of the content was performed at the client computing device.

As network resources such as HTML documents are downloaded from the server they may be passed to an HTML subsystem 804 which parses the document, initiates additional downloads in the networking subsystem, and creates a structural representation of the document. Modern browsers may also contain related subsystems which are used for XHTML, XML and SVG documents. A remote session browsing configuration that splits processing actions at the HTML subsystem 804 might include a remote session browsing configuration utilizing an HTML remote session communication protocol, where an initial HTML page is processed at the NCC POP in order to extract embedded resource identifiers, but additional parsing and processing of the content is performed at the client computing device. In another embodiment, a remote session browsing configuration that splits processing actions at the HTML subsystem 804 might perform initial processing to create the structural representation of the HTML document, and provides a processing result including the structural representation and associated embedded resources to the client computing device for processing.

When CSS is encountered, whether inside an HTML document or an embedded CSS document, it may be passed to a CSS subsystem 806 to parse the style information and create a structural representation that can be referenced later. Illustratively, a remote session browsing configuration that splits processing actions at a CSS subsystem 806 may construct a processing result including the CSS structural representation and HTML structural representation, and provide the processing result and associated embedded resources to the client computing device for processing.

HTML documents often contain metadata, for example the information described in a document header or the attributes applied to an element. The collections subsystem 808 may be responsible for storing and accessing this metadata. A remote session browsing configuration that splits processing actions at a collections subsystem 808 may construct a processing result including processed metadata along with any other structural representations discussed above, and provide the processing result and associated embedded resources to the client computing device for processing.

When JavaScript is encountered, it may be passed directly to a JavaScript subsystem 810 responsible for executing the script. The JavaScript subsystem 810 has been examined fully over the years, and may be one of the most well known browser subsystems in the art. A remote session browsing configuration that splits processing actions at a JavaScript subsystem 810 may construct a processing result including an internal representation of one or more JavaScript scripts, including, but not limited to state data or a representation of the script in a native or intermediate form, as well as any other processed structures or data discussed above, and provide the processing result and associated embedded resources to the client computing device for processing.

Because many JavaScript engines are not directly integrated into the browser, there may be a communication layer including the marshalling subsystem 812 between the browser and the script engine. Passing information through this communication layer may generally be referred to as marshaling. A remote session browsing configuration that splits processing actions at a marshalling subsystem 812 may construct a processing result including marshalling data as well as any other processed structures, scripts, or data discussed above, and provide the processing result and associated embedded resources to the client computing device for processing.

In some embodiments, JavaScript interacts with an underlying network resource such as a Web document through the Document Object Model APIs. These APIs may be provided through a native object model subsystem 814 that knows how to access and manipulate the document and is the primary interaction point between the script engine and the browser. Illustratively, a remote session browsing configuration that splits processing actions at a native object model subsystem 814 may construct a processing result including native object model state data or API calls as well as any other processed structures, scripts, or data discussed above, and provide the processing result and any other associated embedded resources to the client computing device for processing.

Once the document is constructed, the browser may needs to apply style information before it can be displayed to the user. The formatting subsystem 816 takes the HTML document and applies styles. Illustratively, a remote session browsing configuration that splits processing actions at a formatting subsystem 816 may construct a processing result including an HTML representation with applied styles, as well as any other processed state data, API calls, structures, scripts, or data discussed above, and provide the processing result and any other associated embedded resources to the client computing device for processing.

In one embodiment, CSS is a block based layout system. After the document is styled, the next step, at a block building subsystem 818, may be to construct rectangular blocks that will be displayed to the user. This process may determine things like the size of the blocks and may be tightly integrated with the next stage, layout. A remote session browsing configuration that splits processing actions at a block building subsystem 818 may construct a processing result including block information, as well as any other processed state data, API calls, structures, scripts, or data discussed above, and provide the processing result and any other associated embedded resources to the client computing device for processing.

Subsequent to the browser styling the content and constructing the blocks, it may go through the process of laying out the content. The layout subsystem 820 is responsible for this algorithmically complex process. Illustratively, a remote session browsing configuration that splits processing actions at a layout subsystem 820 may process the various state data, API calls, structures, scripts, or data discussed above to construct a processing result including layout information for the client computing device. Illustratively, an NCC POP may make use of various data or settings associated with the client computing device or browser (e.g., as provided in the initial browse session request) in order to generate a suitable layout for the client computing device. For example, a mobile device may provide a screen resolution and a display mode to the NCC POP. The NCC POP may base layout calculations on this screen resolution and display mode in order to generate a processing result corresponding to a content representation suitable for a browser running on the mobile device. Illustratively, in various embodiments, any other subsystem implemented by the NCC POP may make use of data associated with the client computing device or browser in generating a processing result for the client.

The final stage of the process may occur inside the display subsystem 822 where the final content is displayed to the user. This process is often referred to as drawing. A remote session browsing configuration that splits processing actions at the networking subsystem 802 might include a remote session browsing configuration utilizing an RDP remote session communication protocol, where nearly all processing is performed at the NCC POP, and a processing result including bitmap data and low level interface data are passed to the client computing device for display.

Figure 9:
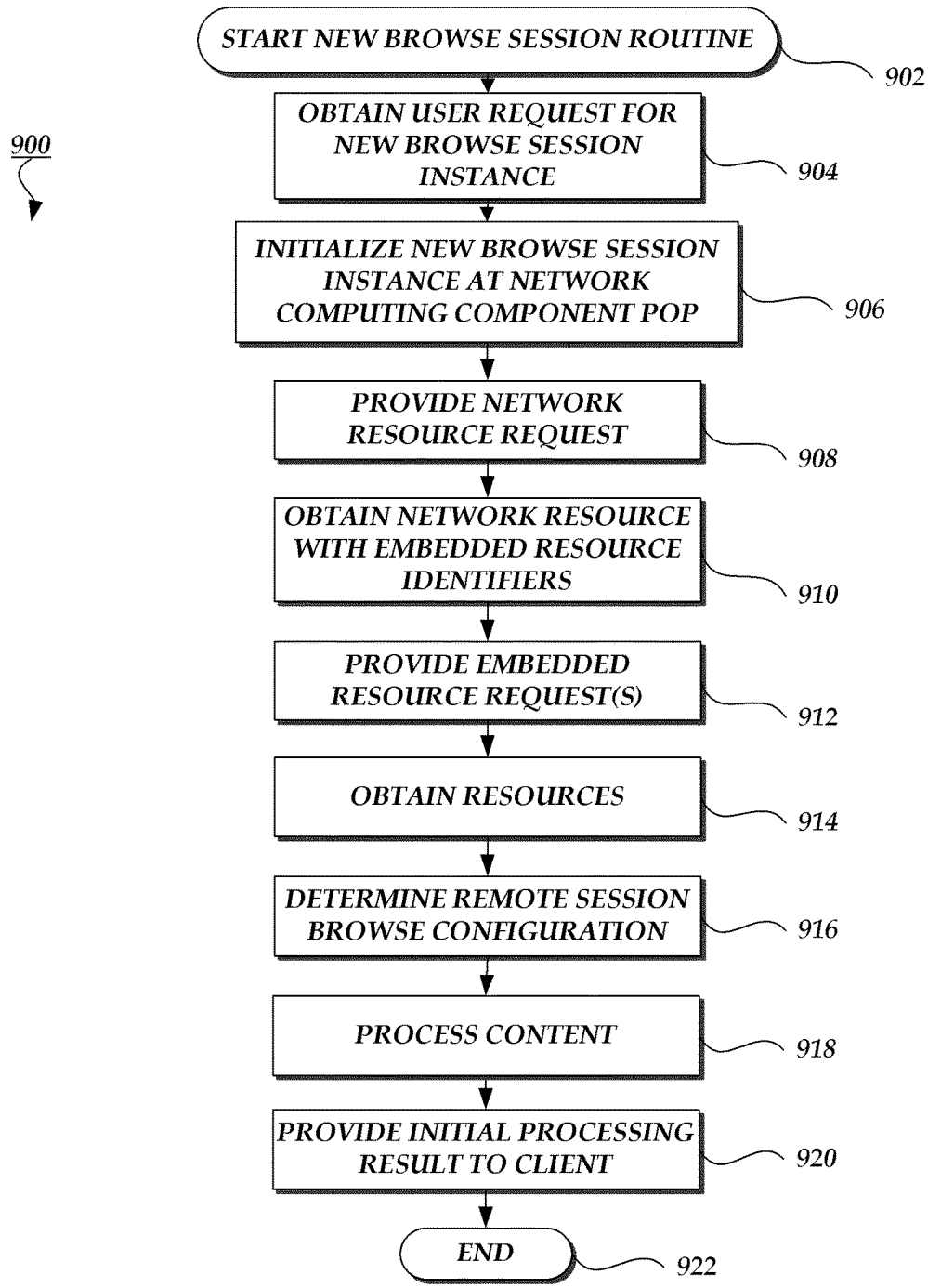
FIG. 9 is a flow diagram illustrative of a new browse session routine implemented by network computing provider.

FIG. 9 is a flow diagram illustrative of a new browse session routine 900 implemented by network computing provider 107 of FIG. 1. New browse session routine 900 begins at block 902. At block 904, the network computing provider 107 receives a new browse session request from client computing device 102. As previously described, the client computing device 102 may load a browser for viewing network content in response to an event or user request. Subsequent to the browser being loaded, the browser may be implemented request a new browse session. From the perspective of the user of the client computing device, the request for the new browse session corresponds to the intended request to transmit the request to one or more corresponding content providers 104. Illustratively, this request may be generated automatically as a result of the browser loading (e.g., a request for a default or "home" page), or may be generated as a result of a user following a link or entering a network address into an address bar. This browse session request may include one or more addresses or references to various network resources or other content requested by the client computing device 102. In an illustrative embodiment, the browse session request is transmitted in accordance with an API.

At block 906 the network computing provider 107 may select an associated NCC POP to instantiate a new browse session based on the browse session request. As discussed above with reference to FIG. 1, a network computing provider 107 may include any number of NCC POPs distributed across any number of physical or logical locations. A network computing provider 107 may select a NCC POP to service a browse session request based on any number of factors, including, but not limited to available NCC POP resources (e.g., available memory, processor load, network load, etc.), a financial cost of servicing the browse session request at the NCC POP, the NCC POP location respective to a client computing device 102, content provider 104, or CDN POP 116, a NCC POP cache status (e.g., whether a requested resource is already stored in an NCC POP cache), etc.

In one embodiment, the network computing provider 107 may select a number of NCC POPs to service a browse session request. For example, the network computing provider 107 may select two NCC POPs with different logical locations in the network. Each NCC POP may independently request and process network content on the behalf of the client computing device 102, and the client computing device 102 may accept data from the first NCC POP to return a processing result. Subsequent to being selected by the network computing provider 107, NCC POP 142 may obtain the browse session request. In one embodiment, NCC POP 142 may have the browse session request forwarded to it by a component of network computing provider 107. In another embodiment, NCC POP 142 or client computing device 102 may receive connection information allowing the establishment of direct communication between NCC POP 142 and client computing device 102. Illustratively, NCC POP 142 may be provided with the browse session request originally provided to network computing provider 107, may be provided with a subset of information (e.g., just a network address of requested content), or may be provided additional information not included in the original browse session request.

Subsequent to the NCC POP 142 being selected, the network computing provider 107 may cause the NCC POP 142 to instantiate a new browse session. Illustratively, instantiating a new browse session instance may include loading a new virtual machine instance and/or browser instance at the NCC POP 142, reserving or allocating device memory, storage or cache space, processor time, network bandwidth, or other computational or network resources for the new browse session. Illustratively, one or more characteristics of the new browse session instance and/or browser instance may be based on client computing device 102 information included in the browse session request. For example, the browse session request may include a device type or browser type, a device screen resolution, a browser display area, or other information defining the display preferences or capabilities of the client computing device 102 or browser. The NCC POP 142 may accordingly instantiate a virtual machine instance and/or a browser instance with the same or similar capabilities as the client computing device 102. Illustratively, maintaining a virtual machine instance and/or browser with the same or similar capabilities as the client computing device 102 may allow the NCC POP 142 to process network content according to the appropriate dimensions and layout for display on the particular client computing device 102.

In some embodiments, the NCC POP 142 may utilize an existing virtual machine instance and/or browser instance in addition to, or as an alternative to, instating a new browse session. For example, subsequent to the NCC POP 142 being selected, the network computing provider 107 may cause the NCC POP 142 to associate an existing browser instance and/or virtual machine instance, such as one or more instances previously instantiated at the NCC POP 142, with the new browse session request. Illustratively, an existing browser session and/or virtual machine instance may correspond to another browse session, remote application session, or other remote process associated with the user or client computing device 102, or may be a previously instantiated software instance from an unrelated browse session or remote process. In other embodiments, the NCC POP 142 may instantiate a new browser or other application process in an existing virtual machine instance, or may combine the utilization of previously instantiated and newly instantiated software processes in any number of other ways. In still further embodiments, the network computing provider or NCC POP 142 may instantiate any number of new virtual machine instances and/or browser instances (or make use of existing instantiated instances) based on a single browse session request.

At block 908 the network computing provider 107 may provide a request for one or more network resources to a content provider or CDN service provider based on a network address included in the browse session request. In various embodiments, one or more network resources may be additionally or alternately retrieved from a cache local to the NCC POP 142 or otherwise associated with the network computing provider 107. One of skill in the art will appreciate that, in the case of other embodiments, the link or network address may correspond to a document or file stored in a digital file locker or other network storage location or at a cache component associated with the network computing provider 107 or client computing device 102. In some embodiments, the new session request may include a document or file in addition to or as an alternative to a network address. At block 910, the network computing provider 107 obtains the one or more network resources. Subsequent to obtaining the requested network resource, the NCC POP 142 may process the network resource to extract embedded resource identifiers.

At block 912, the network computing provider 107 may provide resource requests to one or more sources of content such as content providers, CDN service providers, and caches. The resource requests may correspond to embedded resources based on the one or more embedded resource identifiers extracted from the one or more network resource as described in block 910 above. At block 914, the network computing provider 107 may obtain these embedded resources from any number of different sources, sequentially or in parallel.

At block 916, the network computing provider 107 may process the one or more network resources and associated embedded resources to determine a remote session browsing configuration for the processing and communication of content to the client computing device 102. A remote session browsing configuration may include any proprietary or public remote protocol allowing exchange of data and user interactions or requests between a client and a remote server. The remote session browsing configuration may illustratively include both a remote session communication protocol and a processing schema for providing processed (or unprocessed) content to a client computing device for display in the content display area of a browser.

Illustratively, a remote session browsing configuration may define or specify a remote session communication protocol, including, but not limited to, a network protocol, signaling model, transport mechanism, or encapsulation format for the exchange of state data, user interactions, and other data and content between the network computing provider and the client computing device. Examples of remote session communication protocols known in the art include Remote Desktop Protocol (RDP), X-Windows protocol, Virtual Network Computing (VNC) protocol, Remote Frame Buffer protocol, HTML, etc. For example, RDP illustratively specifies a number of processing mechanisms for encoding client input (e.g., mouse movement, keyboard input, etc.) into protocol data units for provision to a remote computing device, and corresponding mechanisms for sending bitmap updates and low level interface information back to the client device. As another example, the HTML protocol illustratively provides a mechanism for providing files defining interface information and containing resources references from a server to a client, and a corresponding mechanism for a client computing device to provide requests for additional files and resources to the server. In one embodiment, the NCC POP 142 may provide an initial communication to the client computing device 102 after determining the remote session communication protocol. This initial communication may allow the client computing device 102 to prepare to receive communications in the selected remote session communication protocol, and, in the case of pull remote session communication protocols like HTTP, may cause the client computing device to send an initial resource request to the browse session instance running on the NCC POP 142.

Each remote session browsing configuration may additionally define a split of processing actions between the network computing and storage service (e.g., NCC POP 142) and the client computing device (e.g., client computing device 102). In one embodiment, a particular split of processing actions may be based on or mandated by a particular remote session communication protocol. In another embodiment, a remote session communication protocol may allow several different splits of processing actions depending on the implementation or configuration of the protocol. For the purpose of illustration, many pieces of network content (e.g., Web pages, video, Flash documents) may require various processing actions before being displayed on a computing device. A Web page, for example, may be parsed to process various HTML layout information and references to associated resources or embedded content such as CSS style sheets and JavaScript, as well as embedded content objects such as images, video, audio, etc. The HTML and each referenced object or piece of code will typically be parsed and processed before a representative object model corresponding to the Web page may be constructed. This object model may then be processed further for layout and display in a content display area of a browser at the client computing device 102. Illustrative browser processing actions are described in greater detail below with reference to FIG. 8. One of skill in the art will appreciate that, in the case of other embodiments or applications, various other processing actions may be required.

A remote session browsing configuration may specify that various of the processing actions required for display of piece of network content be performed at the remote computing device, such as the NCC POP 142, rather than at the client computing device 102. Network content partially (or wholly) processed at the network computing provider may be referred to as a processing result. As discussed below, the split of processing actions may be associated with or linked to the remote session communication protocol used for exchanging data and client input between the NCC POP 142 and client computing device 102.

For example, a remote session communication protocol such as RDP that transmits a processing result including low level interface information and bitmaps to the client computing device 142 for display may be associated with a remote session browsing configuration that specifies performing all, or nearly all, of the necessary content processing actions at the NCC POP 142. While using RDP, the NCC POP 142 may, for example, run a full instance of a browser the NCC POP 142 and transmit a processing result consisting of bitmap updates corresponding to a representation of the displayed content to the client computing device 102. The client computing device 102, in this example, may merely be required to assemble the transmitted bitmap updates for display in the content display area of the browser, and may perform none of the processing of the actual HTML, JavaScript, or data objects involved in the display of an illustrative piece of network content. As another example, a remote session browsing configuration utilizing a remote session communication protocol such as HTML may transmit network content in a largely unprocessed form. The client computing device 102 may thus perform all of the processing actions required for display of network content while the NCC POP 142 performs little or no processing.

The NCC POP 142 may base its determination of a remote session browsing configuration on any number of factors, including, but not limited to, one or more characteristics of one or more of the requested resources, content provider 104, or CDN service provider 106, one or more characteristics of the content address or domain, one or more characteristics of the client computing device 102, browser or application, user, one or more characteristics of the NCC POP 142, or one or more characteristics of the network or network connection, etc. Characteristics of requested resources may include, but are not limited to, a data format, a content type, a size, processing requirements, resource latency requirements, a number or type of interactive elements, a security risk, an associated user preference, a network address, a network domain, an associated content provider, etc. Characteristics of a content provider 104, CDN service provider 106, computing device 102, or NCC POP 142 may include, but are not limited to, processing power, memory, storage, network connectivity (e.g., available bandwidth or latency), a physical or logical location, predicted stability or risk of failure, a software or hardware profile, available resources (e.g., available memory or processing, or the number of concurrently open software applications), etc. The NCC POP 142 may further consider perceived security threats or risks associated with a piece of content or domain, preferences of a client computing device or a content provider, computing or network resource costs (e.g., a financial cost of processing or bandwidth, resource usage, etc.), predetermined preferences or selection information, any additional processing overhead required by a particular remote session browsing configuration, a cache status (e.g., whether a particular resources is cached at a NCC POP 142, at the client computing device 102, or at other network storage associated with the network computing provider), a predicted delay or time required to retrieve requested network content, a preferred content provider or agreements with a content provider for a particular remote session browsing configuration or level of service, a remote session browsing configuration being used for another (or the current) browse session by the same user, or any other factor.

In some embodiments, an NCC POP 142 may base a determination of a remote session browsing configuration on past behavior or practice. For example, an NCC POP 142 that has determined a remote browse session configuration for a particular resource in the past may automatically select the same remote browse session configuration when the resource is requested by the same (or potentially a different) user. As another example, a user that has a history of frequently accessing Web sites with extensive processing requirements may automatically be assigned a remote session browsing configuration that performs the majority of processing at the NCC POP 142. In other embodiments, an NCC POP 142 may base a determination of a remote browse session configuration on predictions of future behavior. For example, an NCC POP 142 may base its determination of a remote browse session configuration for a particular resource on an analysis of past determinations made for a particular Web site, network domain, or set of related resources. A content provider that historically has provided video-heavy Web pages may be associated with a remote session browsing configuration that emphasizes video performance at the client computing device 102. Illustratively, past historical analysis and future predictions may be considered as one or more of a number of factors on which to base the remote session browsing configuration determination process, or may be definitive in the decision making process. For example, once an NCC POP 142 determines a remote session browsing configuration for a particular content provider, it may skip the remote session browsing configuration determination process for any future resources served from the content provider. Illustratively, the NCC POP 142 may re-determine a remote session browsing configuration to be associated with the content provider after a fixed period of time, or after the NCC POP 142 has identified or determined a change in the content being served by the content provider.

In other embodiments, a network resource, Web site, network domain, content provider, or other network entity may specify or otherwise request the use of a particular remote browse session configuration in a resource tag, metadata, or other communication with an NCC POP 142. The NCC POP 142 may treat the request as definitive, or may consider the request as one of multiple factors to be considered in the decision making process.

For example, a remote session browsing configuration utilizing a remote session communication protocol such as RDP may specify extensive processing to occur at the network computing provider 107 (e.g., at NCC POP 142) rather than at the client computing device 102. The remote session browsing configuration may thus leverage the processing power of the NCC POP 142 to achieve lower latencies and presentation delay when dealing with network content that requires a great deal of pre-processing (e.g., content with a great deal of CSS or JavaScript information defining page layout). The NCC POP 142 may therefore select a remote session browsing configuration that performs a substantial amount of processing at the network computing provider 107 and utilizes RDP or a similar remote session communication protocol for communication of processing-intensive content. Conversely, a remote session browsing configuration that utilizes a remote session communication protocol such as HTML may specify extensive processing at the client computing device 102 rather than at the network computing provider 107. The remote session communication protocol may thus achieve smaller delays and smoother presentation when presented with simple network content that requires very little processing or network content that requires rapid change in displayed content after its initial load. For example, a Web page with embedded video may perform better performing the majority of processing locally and utilizing HTML rather than RDP as a remote session communication protocol. A remote session browsing configuration specifying extensive processing at the network computing provider 107 must process the video at the NCC POP 142 and rapidly send screen updates (e.g. by RDP) to the client computing device 102, potentially requiring a great deal of bandwidth and causing choppy playback in the browser, while a remote session browsing configuration specifying local processing may provide raw video information directly to the client computing device 102 for display (e.g. by HTML), allowing for client side caching and a smoother playback of content.

As a further example, the NCC POP 142 in communication with a client computing device 102 with extremely limited processing power may elect to use a remote session browsing configuration that requires very little processing by the client computing device, for example, using RDP to transmit NCC POP 142 processed results. Conversely, an NCC POP 142 providing an extremely interactive Web page may elect to use a remote session browsing configuration that allows the client computing device 102 to handle user interactions locally in order to preserve interface responsiveness, for example, using HTML to transmit substantially unprocessed data. As a still further example, a NCC POP 142 may base the determination of a remote session browse configuration on preferences provided by the client computing device 102. A client computing device 102 may illustratively include preferences for a remote session browse configuration in an initial browse session request, or at any other time. The NCC POP 142 may utilize these preferences as an alternative to, or in addition to any other factor or decision metric. Illustratively, allowing the client computing device 102 to set or influence the selection of a remote session browse configuration allows the NCC POP 142 to take user preferences in account when determining a remote session browse configuration. For example, a user worried about initial page load times may prefer to use a remote session browsing configuration heavy on remote processing and utilizing an RDP remote session communications protocol, while a user wishing to maintain an extremely responsive interface may prefer using a remote session browsing configuration that performs the majority of the processing on the client computing device 102, for example, using an HTML remote session communication protocol.

Illustratively, the NCC POP 142 may base a determination of a remote browsing configuration on any factor or combination of factors. For example, the NCC POP 142 may select a remote session browsing configuration based on a single factor, or may assign weights to one or more factors in making a determination. In some embodiments, the determination process of the NCC POP 142 may change based on one or more factors described above. For example, an NCC POP 142 communicating with a client computing device 102 over a network with a surplus of unused bandwidth may give a low weight to factors such as the network requirements of a remote browse session, and may give a higher weight to factors such as the latency of page interactions, while an NCC POP 142 communicating with a client computing device 102 over a limited bandwidth network may give a higher weight to factors dealing with the efficiency of the remote session browse protocol over a network.

In one embodiment, the NCC POP 142 may select a single remote session browsing configuration for a set of network content. For example, the NCC POP 142 may select a single remote session browsing configuration for a requested network resource such as a Web page. The NCC POP 142 may thus process the Web page together with all embedded content based on the selected remote browsing session protocol, and utilize the remote browsing session protocol to exchange user interaction data and updated browse session data for all embedded content associated with the Web page. In another embodiment, the NCC POP 142 may select different remote session browsing configurations for one or more resources in a set of network content. For example, a network resource such as a Web page may reference processing intensive embedded JavaScript or CSS resources, as well as embedded video resources. The NCC POP 142 may select a first remote session browsing configuration for the Web page and all embedded resources excluding the embedded video resource, and a second remote session browsing configuration for the embedded video resource. Illustratively, this may result in the NCC POP 142 utilizing RDP to send a processing result to the client computing device 102 for display of the Web page and associated embedded resources, while utilizing HTTP to send the embedded video as a separate, unprocessed file. In one embodiment, the client computing device 102 may perform the minimal processing required to display the RDP processing result corresponding to the Web page and embedded resources, and may also perform additional processing necessary to display the embedded video, for example, overlaying the video on top of the displayed RDP representation of the Web page. Any number of remote session browsing configurations may be selected to correspond to any number of resources or objects included in a set of network content, regardless of whether resources or objects are obtained from a content provider 104 or CDN service provider 106 in one or more logical files or data structures.

Although the selection of a remote session browsing configuration is illustratively depicted herein as occurring after all network resources and associated embedded content have been obtained by the NCC POP 142, one skilled in the relevant art will appreciate that the selection of a remote session browsing configuration may be performed at any time. For example, the NCC POP 142 may select a remote session browsing configuration after receiving a new browse session request or related information from the client computing device, may select a remote session browsing configuration after obtaining a network resource, but before obtaining any associated embedded resources, or at any other time. In some embodiments, the NCC POP 142 may switch to a new remote session browsing configuration at some time subsequent to the client computing device 102 obtaining an initial processing result. Illustratively, the NCC POP 142 selecting a new remote session browsing configuration may occur automatically after a certain time period or event or in response to a change in network conditions, NCC POP 142 or client computing device 102 load or computing resources, or any other factor described above as potentially influencing the choice of remote session browsing configuration. Illustratively, an NCC POP 142 dealing with other types or formats of information may select a remote session protocol based on any number of similar factors. For example, one of skill in the relevant art will appreciate that a similar schema may be developed for the processing of images, video, audio, database information, 3d design data, or any other file format or type of data known in the art.

The client computing device 102 may, in various embodiments, further instantiate a parallel browsing process sequentially or simultaneously with the request for a remote browse session. In one embodiment, a client computing device 102 may instantiate a traditional local browse session as known in the art (e.g., providing content requests from the browser and processing obtained resources locally) in addition to one or more remote browse instance executing at an NCC POP 142. In another embodiment, a client computing device 102 may be provided with unprocessed network resources by the NCC POP 142. Illustratively, the network resources may have been retrieved from one or more content providers, CDNs, or cache components by the NCC POP 142. The resources may be provided to the client computing device 102 to process locally in parallel with the remote browse instance executing at the NCC POP 142. In still further embodiments, the network computing provider or NCC POP 142 may instantiate any number of new virtual machine instances and/or browser instances (or make use of existing instantiated instances) to process resources and/or send processing results to the client computing device 102 in parallel. Illustratively, the local browse session at the client computing device 102 and the remote browse session instance at the NCC POP 142 may execute in parallel.

In one embodiment, a local browse session executing at the client computing device 102 may obtain unprocessed content (e.g., html Web pages, embedded content, and other network resources) from the NCC POP 142 responsive to a browse session request. Illustratively, the content may have been retrieved by the NCC POP 142 from a content provider, CDN, or cache in response to the browse session request. The unprocessed content provided by the NCC POP 142 may include all the content associated with the browse session request or may supplement content existing in a cache of the client computing device, retrieved from a content provider or CDN, or obtained from some other source. In one embodiment, a client computing device 102 may obtain all requested content from a local cache, and may not obtain any unprocessed resources or content from the NCC POP 142. Subsequent to obtaining the unprocessed content, client computing device 102 may process the requested content in parallel with a remote browse session executing at the NCC POP 142. For example, as the local browse session executing at the client computing device 102 is processing the requested content, a remote browse session executing at the NCC POP 142 may be processing the same content at substantially the same time. Once the NCC POP 142 has performed a set of processing actions on the content to generate a processing result (e.g., as specified by a determined remote session browsing configuration), the NCC POP 142 may provide the processing result to the client computing device 102.

For the purpose of illustration, a client computing device 102 may require a longer load time to obtain and process requested network resources than a browse session instance running at the NCC POP 142. For example, the NCC POP 142 may obtain and process content quickly due to its position on the network and the relative processing power of the local client computing device as compared to the NCC POP 142. Even if the NCC POP 142 provides the client computing device 102 with all requested network content, the client computing device 102 may still obtain a processing result from NCC POP 142 before the local browse session has fully completed processing the requested resources. The client computing device 102 may complete any further processing steps and display the obtained processing result before completing local processing and display of the content. Illustratively, this may allow the client computing device 102 to take advantage of an NCC POP 142's quicker content load time relative to a traditional local browse session. Prior to the local browse session completing the processing all requested resources, the browser may process any user interactions locally and/or remotely as described in FIGS. 5A and 11 below.

Once the local browse session has fully obtained and processed resources corresponding to the requested content, the computing device 102 may determine whether to continue to display results obtained from the NCC POP 142 (and process user interactions at the NCC POP 142) using the determined remote session browsing configuration or switch to processing user interactions locally. Switching to process user interactions locally may include replacing a displayed representation of the requested resources based on a processing result obtained from the NCC POP 142 with a local display of the requested resources. For example, a browser may display a representation of a Web page corresponding to a processing result from the NCC POP 142 (e.g., RDP display information representing the rendered page) until the browser is finished processing and rendering the Web page locally. The browser may then replace the representation from the NCC POP 142 with the locally rendered representation of the Web page. Illustratively, replacing one representation with another representation may be transparent to the user. For example, the local and NCC POP 142 representations of the Web page may be identical or substantially identical. In one embodiment, when the NCC POP 142 representation of the web page is displayed, the browser may send various user interactions with the displayed page to the NCC POP 142 for processing. When the locally rendered version of the Web page is displayed, user interactions may be processed locally at the browser. Illustratively, the determination of which representation of the requested resources to display (e.g., local or from the NCC POP 142) may be based on any of the same factors described with reference to determining a remote session browse protocol in above.

In one embodiment, the client computing device 102 may switch to processing user interactions locally as soon as local resources are fully loaded. Illustratively, the remote browse session instance running at the NCC POP 142 may be terminated after switching to local processing, or the remote browse session instance may be maintained as a backup in case of unresponsiveness or a failure with regards to the local browse session. For example, the client computing device 102 may process user interactions locally, as well as sending remote user interaction data to the NCC POP 142 in accordance with the selected remote session browsing configuration. The remote user interaction data may be used by the NCC POP 142 to keep the remote browse session instance fully in parallel with the local browse process being executed by the browser at the client computing device 102. As long as the local browse session continues to handle user interactions, the NCC POP 142 may either refrain from sending updated processing results, or may send updated processing results ignored by the client computing device 102. If a problem develops with the local browse session at the client computing device 102, updated processing results may be provided to the client computing device 102 from the NCC POP 142 for processing and display in lieu of the local browse session. Illustratively, this switch from the local browse session to remote processing may be transparent to the user. In some embodiments, the client computing device 102 may switch from a local browse session to a remote browse session instance based on factors other than unresponsiveness or failure at the local browser. For example, the client computing device 102 or network computing and storage component 107 may select between a remote and local browse session based on any of the factors enumerated with regards to determining a remote session browse protocol above In another embodiment, the client computing device 102 may continue to process and display updated processing results from the NCC POP 142 even after the local browse session has fully loaded the requested content. The client computing device 102 may terminate the local browse session or may run the local browse session in parallel as a backup process in the converse of the example provided above. It should be appreciated that although the local browse session is described here for the purpose of illustration as being slower to load than the remote browse session instance, in some embodiments the local browse session may load the content faster than the remote browsing session, in which case the browser may process user interactions locally until the remote browse process has fully loaded the requested content. In some embodiments, the client computing device 102 may display and process user interactions through whichever browse session, local or remote, loads the requested content first.

In various other embodiments, the network computing provider 107 may instantiate multiple remote browse session instances to run in parallel in addition to or as an alternative to instantiating a local browse session. Illustratively, these parallel browse session instances may utilize any of the same or different remote session browse protocols, and may act as backups in the manner described above with regard to a local browse session, or may be used and switched between as alternatives in order to maximize browser performance at the client computing device 102. For example, in response to one or more browse session requests, the network computing provider 107 may instantiate a browse session instance running on a first NCC POP and utilizing an RDP protocol as well as browse session instance running on a second NCC POP utilizing an X-Windows protocol. The client computing device 102 or the network computing provider 107 may determine which browse session instance and protocol should be used based on performance or resource usage considerations as described with regards to determining a remote session browse protocol above.

With continued reference to FIG. 9, at block 918, the network computing provider 107 may process the obtained content, including the one or more requested network resources and embedded network resources, according to the determined remote session browsing configuration to generate an initial processing result. At block 920, the network computing provider 107 may provide the initial processing result to the client for further processing and display in the content display area of the browser. For the purposes of further example, an illustrative client new browse session interaction routine 1000 implemented by client computing device 102 is described below with reference to FIG. 10. At block 922, the start new browse session routine 900 ends.

Figure 10:
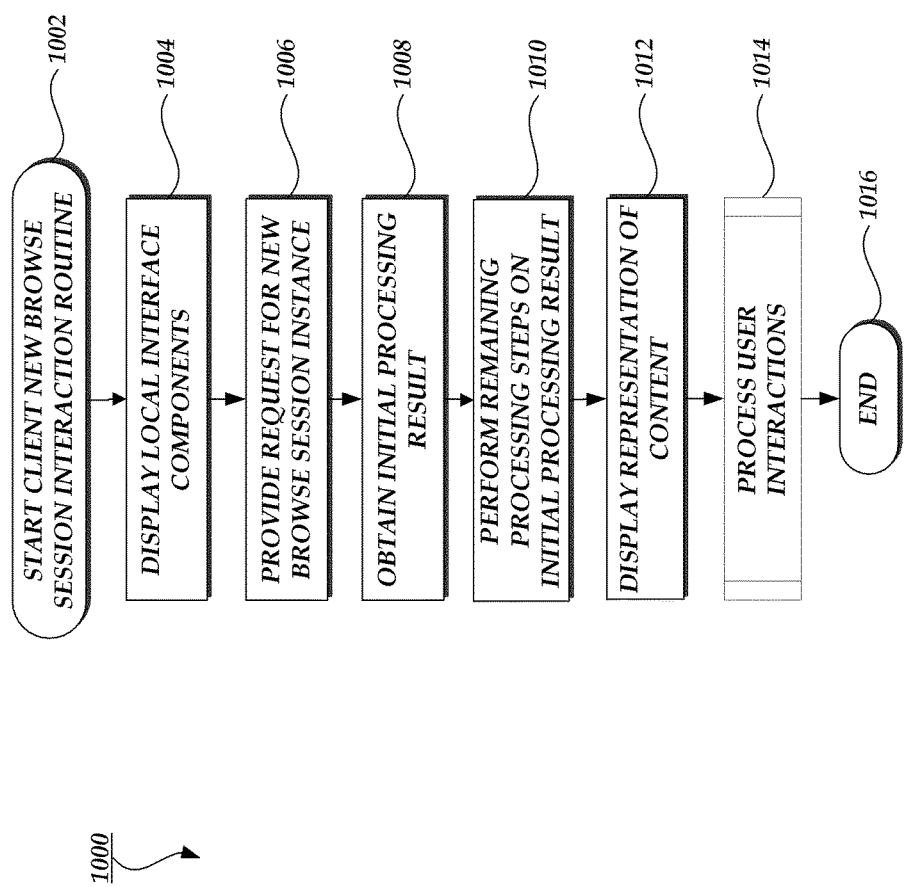
FIG. 10 is a flow diagram illustrative of a client new browse session interaction routine implemented by a client computing device.

FIG. 10 is a flow diagram illustrative of a client new browse session interaction routine 1000 implemented by client computing device 102. New browse session interaction routine 1000 begins at block 1002 in response to an event or user request causing the client computing device 102 to load a browser for viewing network content. At block 1004, the client computing device loads locally managed components of the browser, including all local interface components. As described above with reference to FIGS. 5A and 7, local interface components may include toolbars, menus, buttons, or other user interface controls managed and controlled by the software browser application or any other process executing or implemented locally at the client computing device. At block 1006, the client computing device 102 provides a request for a new browse session instance to the network computing provider 107. From the perspective of the user of the client computing device, the request for the new browse session corresponds to the intended request to transmit the request to one or more corresponding content providers 104. In other embodiment, the new session request may correspond to a request to load a file or other document (e.g., a request to load an image in a photo-editing application, etc.). Illustratively, the request may be generated automatically as a result of the browser loading (e.g., a request for a default or "home" page), or may be generated as a result of a user following a link or entering a network address into an address bar. As illustrated with respect to FIG. 2, the browse session request is transmitted first to a network computing provider 107. In an illustrative embodiment, the network computing provider 107 utilizes a registration API to accept browse session requests from the client computing device 102.

A browse session request may include any number of pieces of data or information including, but not limited to, information associated with a user, information associated with the client computing device 102 or software on the client computing device (e.g., hardware or software information, a device physical or logical location, etc.), information associated with the network 108, user or browser preferences (e.g., a requested remote session browse protocol, a preference list, a decision tree, or other information), information associated with the network computing provider 107, information associated with one or more pieces of requested network content (e.g., the network address of a network resource), etc. For example, a browse session request from the client computing device 102 may include information identifying a particular client computing device hardware specification or a hardware performance level, latency and bandwidth data associated with recent content requests, a desired security level for processing different types of content, a predetermined preference list of remote session browse protocols, and one or more network addresses corresponding to requested network resources, among others. In another example, the browse session request can include information identifying a client computing device 102 screen resolution, aspect ratio, or browser display area in the browse session request may allow the network computing provider 107 to customize the processing of network content for display on the client computing device. As previously described, the browse session request can include network address information corresponding to a requested network resource, which may be in any form including, but not limited to, an Internet Protocol ("IP") address, a URL, a Media Access Control ("MAC") address, etc. In one embodiment, the request for a new browse session instance may correspond to the network computing provider receiving a request for a new browse session instance at block 904 of FIG. 9 above.

At block 1008, the client computing device 102 obtains an initial processing result from the network computing provider 107. Illustratively, the format and data included in the initial processing result may vary based on the remote session browsing configuration selected by the network computing provider 107. In one embodiment, the initial processing result may include or be preceded by data informing the client computing device 102 of the choice of remote session browsing configuration and/or establishing a connection over the remote session communication protocol corresponding to the selected remote session browsing configuration. As discussed above with reference to FIGS. 8 and 9, the obtained initial processing result may include requested content with one or more processing actions performed by the network computing provider 107. Subsequent to obtaining the initial processing result, the client computing device 102 may perform any remaining processing actions on the initial processing result at block 1010.

At block 1012, the client computing device 102 displays the content corresponding to the processed initial processing result. For example, the client computing device 102 may display the processed client in the content display area 702 of a browser 700 as described in FIG. 7A above. In one embodiment, the processing result may only include display data corresponding to content displayed by a browser, and may not include display data corresponding to, for example, the interface controls of a browser instance at the NCC POP 142, the desktop of a virtual machine instance corresponding to the browse session, or any other user interface of the NCC POP 142. For example, the NCC POP 142 may process a Web page and associated content for display via RDP in a browser instance running in a virtual machine instance at the NCC POP 142. The browser instance may have one or more interface elements such as toolbars, menus, scroll bars, etc., in addition to the displayed Web page. The NCC POP 142 may send an RDP processing result corresponding to the displayed Web page only, without any of the interface elements associated with the browser. Illustratively, including an RDP processing result corresponding to the displayed Web page only may allow the browser at the client computing instance 102 to display the Web page by assembling the RDP processing result in the content display area of the browser without any further processing. In another embodiment, the RDP processing result may include a full virtual machine desktop and browser window corresponding to the full interface displayed at the NCC POP 142 browse session instance. The client computing device may automatically identify the area of the RDP processing result corresponding to the requested content, and may display only this area in the content display area of the browser.

At block 1014, the client computing device 102 processes local and remote user interactions. An illustrative routine for processing user interactions is provided below with reference to FIG. 11. At block 1016 the routine ends. Illustratively, a browse session instance instantiated by the network computing content provider 107 may terminate when a browser window or content display area is closed, may terminate when a remote session browse protocol is replaced by a parallel process at the client computing device 102, or may terminate in accordance with a timer or other event. Illustratively, if a browse session has terminated automatically due to a time-out but has associated content still displayed in a browser at the client computing device 102, later attempts by the user to interact with the content may result in a new browse session request being provided to the network computing and storage service provider 107 to start a new browse session according to the last state of the terminated session. Illustratively, terminating a remote browse session after a time-out may allow the network computing storage provider 107 to save computing resources at the NCC POP. In one embodiment, this process may be transparent to the user at client computing device 102, even though the remote browse session has been terminated during the intervening period.

Figure 11:
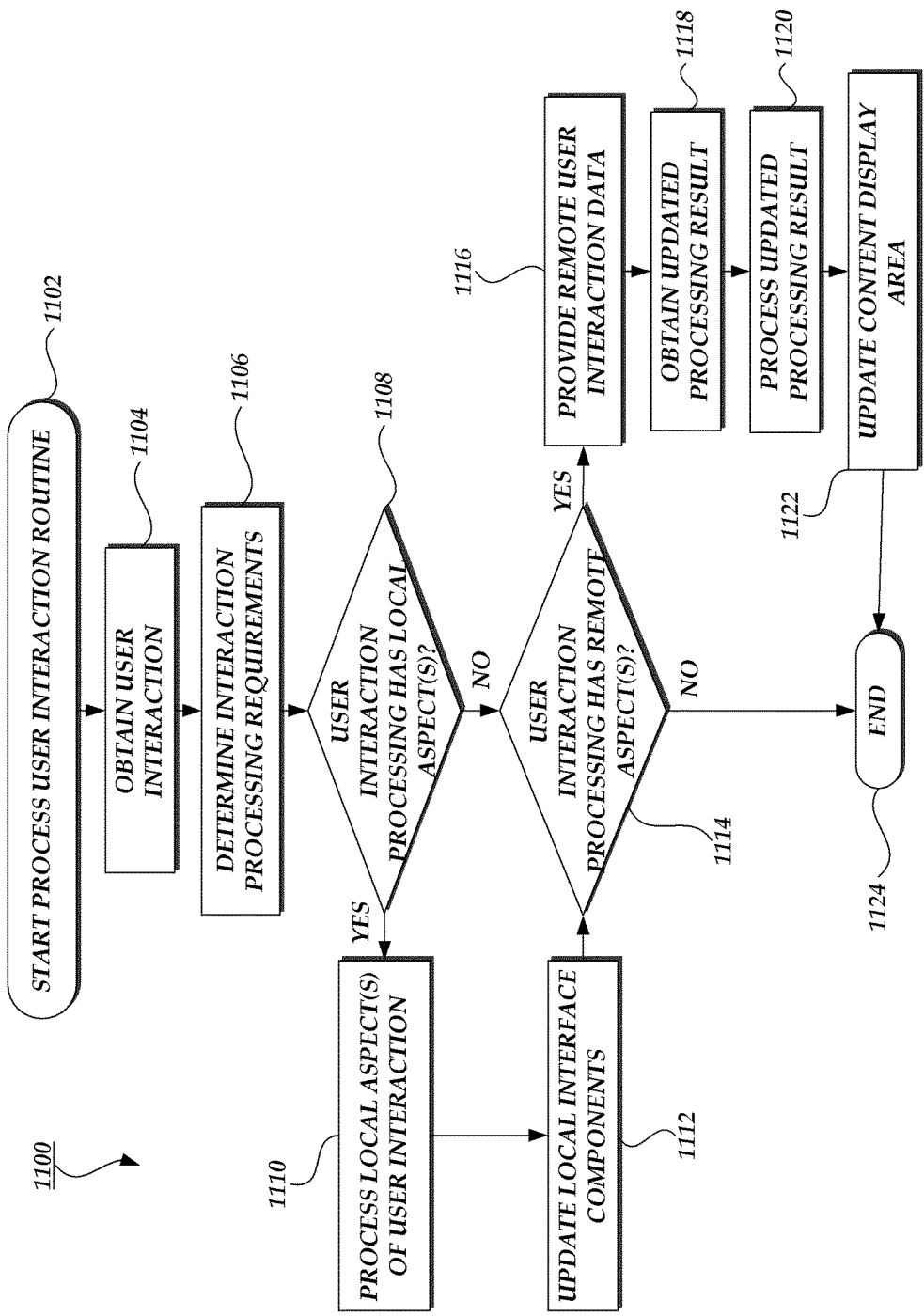
FIG. 11 is a flow diagram illustrative of a process user interaction routine implemented by a client computing device.

FIG. 11 is a flow diagram illustrative of a process user interaction routine 1100 implemented by a client computing device 102. Process user interaction routine 1100 begins at block 1102 in response to an interaction by a user. Illustratively, process user interaction routine 1100 may begin subsequent to the display of content in a content display area of a browser interface. For example, process user interaction routine 1100 may correspond to block 1014 of FIG. 10 above.

Illustratively, the displayed content may have one or more interactive elements, such as forms, buttons, animations, etc. User interaction with these interactive elements may require processing and display of updated content in the content display area. For example, selecting an element in a drop-down menu on a Web page may require processing and may change the configuration or visual appearance of the Web page or embedded resources. Illustratively, the processing required by user interaction with the displayed content may be handled as a local user interaction at the client computing device 102 or as a remote user interaction at the NCC POP 142 depending on the remote session browsing configuration in use. For example, if a remote session browsing configuration utilizing substantial local processing (e.g., sending unprocessed files over HTML), user interactions with displayed content may typically be handled as local user interactions at the client computing device 102. Illustratively, handling user interactions with displayed content as local user interactions at the client computing device 102 may allow for better responsiveness and fewer delays with simple user interactions (e.g., selection of a radio button, or typing text into a field), as interaction data corresponding to the interaction does not need to be sent to the NCC POP 142 for processing.

As a further example, if a remote session browsing configuration utilizing heavy remote processing of content (e.g., sending processed bitmap data over RDP) is being used as the remote session browsing configuration, all user interactions with displayed content may be handled as remote user interactions. For example, user input (e.g., keyboard inputs and cursor positions) may be encapsulated in RDP protocol data units and transmitted across network 108 to the NCC POP 142 for processing. Illustratively, the NCC POP 142 may apply the user interactions to the network content and transmit processing results consisting of updated bitmaps and interface data corresponding to an updated representation of the content back to the client computing device 102. Illustratively, handling user interactions with displayed content as remote user interactions at the NCC POP 142 may have a negative impact on interface responsiveness, as data is required to pass over the network and is limited by network latency; however, user interactions that require a substantial amount of processing may perform better when handled as remote user interactions, as the processing latency of the NCC POP 142 may be substantially lower than the processing latency of the client computing device 102.

In addition to a content display area for displaying network content, a browser may have one or more local interface components, such as toolbars, menus, buttons, or other user interface controls. Interactions with local interface components may be treated as local user interactions or remote user interactions depending on the processing required by the interaction and the remote session browsing configuration as further depicted in illustrative FIG. 7A. For example, some local interface components may be managed locally by browser code running on the client computing device, while other local interface components may have one or more locally managed aspects (e.g., button click feedback, scroll bar redraw, etc), and one or more remote managed aspects treated as remote user interactions (e.g., page refresh, requesting a page at an address in an address bar, etc.)

At block 1104, the client computing device 102 obtains a user interaction from the user. This user interaction may be an interaction with local interface components as described in FIG. 7A and above, or may be an interaction with any interactive elements of the content displayed in the content display area of the browser, such as form fields, buttons, animations, etc. User interaction with these local interface components or interactive elements of displayed content may require local and/or remote processing depending on the nature of the component or element and the processing split specified by the remote session browsing configuration as described in FIG. 7A and above. At block 1106, the client computing device 102 determines the interaction processing requirements for the obtained user interaction. At decision block 1108, if the user interaction has local aspects (e.g., button click feedback, a change to a local browser state, a content element being processed at the client computing device, etc.) the routine 1102 moves to block 1110 to process the local aspect or aspects of the user interaction at the client computing device 102 and subsequently update the local interface components at block 1112. Illustratively, and as discussed above, aspects of the interaction and updating interface components and elements locally allows a browser to provide responsive user interfaces and content. Subsequent to processing local aspect(s) of the user interaction, or if the user interaction has no local elements (e.g., a user interaction with a content element displayed in the content display area when using a remote session browsing configuration processing entirely on the server side and utilizing an RDP remote session communication protocol) the routine 1102 moves to decision block 1114. If the user interaction has remote aspects that require processing, the routine 1102 moves to block 1116 and provides remote user interaction data to the network computing provider 107. Illustratively, in the case of a heavily server side remote session browsing configuration utilizing an RDP remote session communication protocol, the remote user interaction data may include input data such as a cursor position or keyboard input encapsulated in one or more RDP protocol data units. In some embodiments of remote session browsing configurations utilizing RDP or other remote session communication protocols, particular aspects of remote user interaction data such as cursor positions may be provided to the network computing provider 107 on a continuous basis, while in other embodiments of remote session browse configurations remote user interaction data may only be provided to the network computing provider 107 when associated with a user interaction that requires remote processing.

At block 1118, the client computing device 102 obtains an updated processing result from the network computing provider 107, the network computing provider 107 having processed the remote user interaction data to generate an updated representation of the content. At block 1120, the client computing device 102 performs any additional processing required on the updated processing result (based on the remote session browsing configuration) and at block 1122 displays the updated processing result in the content display area of the browser. At block 1124 the process user interaction routine 1102 ends. Illustratively, the routine may be executed again any number of times in response to further user interactions with the browser and displayed content.

Figure 12:
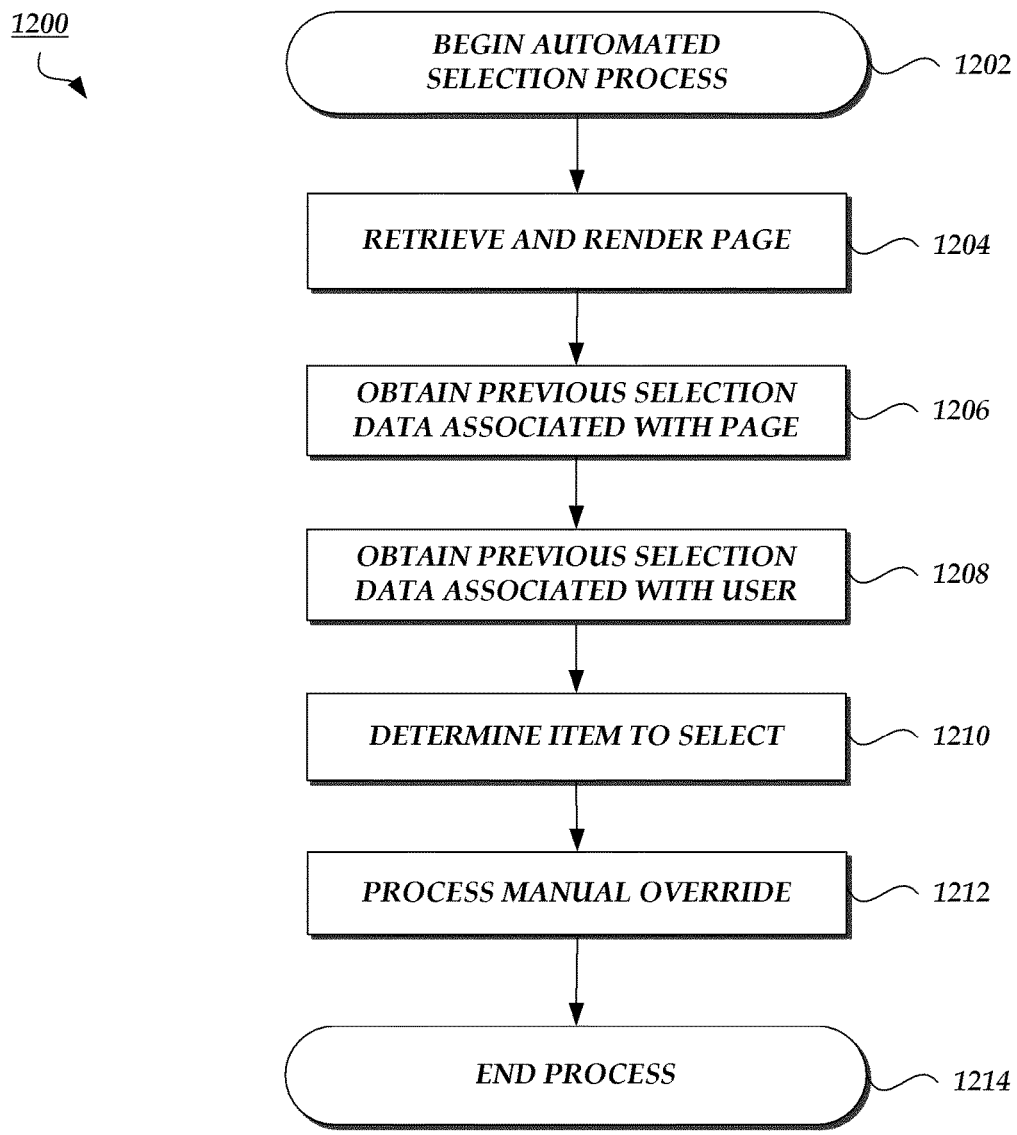
FIG. 12 is a flow diagram illustrative of a routine implemented by a network computing provider for automatically determining which content item to select for addition to composite content pages.

FIG. 12 illustrates a sample routine 1200 for automatically determining which content item on a web page to select for inclusion in a user's composite page. The routine 1200 can be implemented by an NCC or some other component of the network computing provider 107. In some embodiments, portions of the routine 1200 may be executed on the user's client computing device 102 or in conjunction with third parties, such as content providers and search engines.

The routine 1200 begins at block 1202. As described above with respect to FIG. 7C, a user control 714 can be provided to a user, allowing the user to select an entire page to be included in the composite page, or allowing the NCC to determine the most appropriate content item on the source web page—the default content item—to include in the composite page. In some embodiments, the routine 1200 may be initiated in response to another event, such as a change in the design or structure of the source web page. For example, a user may have previously selected a content item on a source web page to include in the user's composite page. Subsequently, the content provider 104 associated with the source web page may have altered the layout or structure of the source web page, moving content sections to different locations on the page, adding new content items, and removing content items. The NCC, when it later retrieves the source web page in order to access the selected content item for inclusion in the user's composite page, can recognize that the content item has moved within the page or been removed from the page. If the content item has been removed, the NCC can automatically determine which content item on the source web page to substitute for the missing selected content item. This automatic determination can help to avoid presenting error messages to the user and/or omitting the selected content item from the composite page entirely.

At block 1204, the NCC may retrieve and render the source web page. The source web page may be retrieved from a cache component of the network computing provider 107, for example if the routine 1200 is being executed in response to activation of input control 714. In such a case, the source web page would likely have been retrieved very recently, and would be an accurate representation of the source web page that the user interacted with. The NCC can launch a browser instance to process and render the source web page. Processing and rendering a source web page prior to copying content items or determining default content items can reduce or prevent unexpected results. For example, a source web page may not include all of its content in the initial HTML file or stream that is transmitted from the content provider. Rather, the source web page may include JavaScript or other executable code which dynamically builds the source web page or fills in content items after the source web page has been received by a browser. In such as case, analyzing a response received from a content provider 104 without processing it as it would be processed on the client computing device 102 can increase the risk that content items are received incorrectly, incomplete, or not received at all. By processing and rendering the source web page in a browser instance, the NCC can reduce this risk, and therefore can have a more complete version of the source web page to analyze. In cases when the complete rendering of a web page is contingent upon interactive user input, the NCC can execute the web page, including JavaScript, and interactively receive user input, for example in a remote desktop mode connection with the client computing device 102. In some embodiments, the NCC can be configured to automatically apply previous inputs entered by the user, thereby facilitating the complete rendering of the target web page without the need for interactive user input.

At block 1206, the NCC can obtain previous selection data associated with the source web page. The previous selection data may have been received from a plurality of users. For example, if the NCC is operated by a network computing provider 107 that services many different users, the NCC may have access to a repository of information about the content item selections of the users. The number of users may be quite significant, in some cases exceeding hundreds or thousands of individual users. The NCC can detect patterns in the selection actions of other users that have viewed a source web page and selected a content item for including in a composite page.

At block 1208, the NCC can obtain previous selection data associated with the current user. The previous selection data of the user may have been received in response to interactions with any number of web pages. As described above with respect to the selection data of other users, the NCC may have access sot a repository of information about the content item selections of the user. For example, each time the user requests a web page, the request may be processed through the network computing provider 107, and the network computing provider 107 may record information about the request. Each time the user selects a content item for inclusion in the composite page, information can be transmitted to the NCC.

At block 1210, the NCC can determine which content item to select as the default item for the source page. The NCC may use a number of different methods to make the determination. In some embodiments, the NCC may detect patterns in the content item selections of other users who have accessed the source web page in the past and selected a content item. For example, the NCC may calculate the relative popularity of each content item on the source web page and determine that the most popular content item is the default content item. The NCC may calculate the popularity of the content items on the page as a starting point, and then adjust the calculation based on other factors, such as the date that each selection was made. Recent selections may be weighted more heavily than older selections, or seasonal selections may be weighted more heavily than recent selections when the recent selections were made during a different season or cycle. For example, the relevance of content items on a sports web page may be cyclical, depending upon which sports are in season. At the beginning of summer, content items related to winter and spring sports may have been more recently selected for inclusion in a composite page than content items related to summer sports, whereas the content items related to summer sports are likely more relevant at the time that NCC makes the determination.

In some embodiments, the NCC may detect patterns in the content item selections of the requesting user. For example, the NCC can determine that the user typically selects sports-related content items for inclusion in the composite page. When the NCC is analyzing a source web page to determine which content item to select by default, the NCC may give more weight to sports-related content items than other content items. In another example, the NCC can determine which web pages the user tends to request, instead of or in addition to which content items the user tends to select. In some embodiments, the NCC can base its determination on other user-specific data, such as demographic data. Illustratively, the NCC may have previously determined or otherwise have access to data indicating that men between the ages of 18-30 tend to select sports-related content items more often than news-related content items. When the NCC is analyzing, for a male user between ages 18-30, a source web page that includes both sports-related content items and news-related content items, the NCC can selected a sports-related content item as the default content item for the page, even if the user does not have a history of selecting sports-related content items.

In some embodiments, the NCC may utilize a combination of content item selection data from other users and content item selection data from the requesting user. For example, the NCC may analyze the two sources of data for similarities, such as common web sites from which content items have been selected, common subject matter of selected content items, etc. The NCC may then determine that for a source web page, other users with a similar content item selection or browsing history tend to select a specific content item on the source web page most often, even if the content item is relatively unpopular among the general population. In another example, the NCC may be provided with access to the user's social networking profile, and may give more weight to content item selections made by the user's social networking contacts, even if the content items are relatively unpopular.

At block 1212, the NCC may receive and process a manual override from the user. For example, the NCC may have selected a content item to be the default content item for a source web page, as described above. The user, upon viewing the composite page with the default content item, may indicate that the content item is to be removed or replaced with a different content item. The NCC can receive the user override and update the composite page definition accordingly. In future executions of the routine 1200, the NCC may revisit such manual overrides when determining a default item for the source web page, and may elect to select a different content item as the default if, for example, a statistically significant number of users have overridden the default selection of the content item. In some embodiments, the default content item on a source web page can be indicated to a user while the user is browsing the source web page, and an input control can be presented to the user to automatically add the default content item to the user's composite page. If the user chooses instead to select a different content item, the NCC may treat the selection as a manual override to be considered in a fashion similar to the previous example during future executions of the routine 1200.

Figure 13:
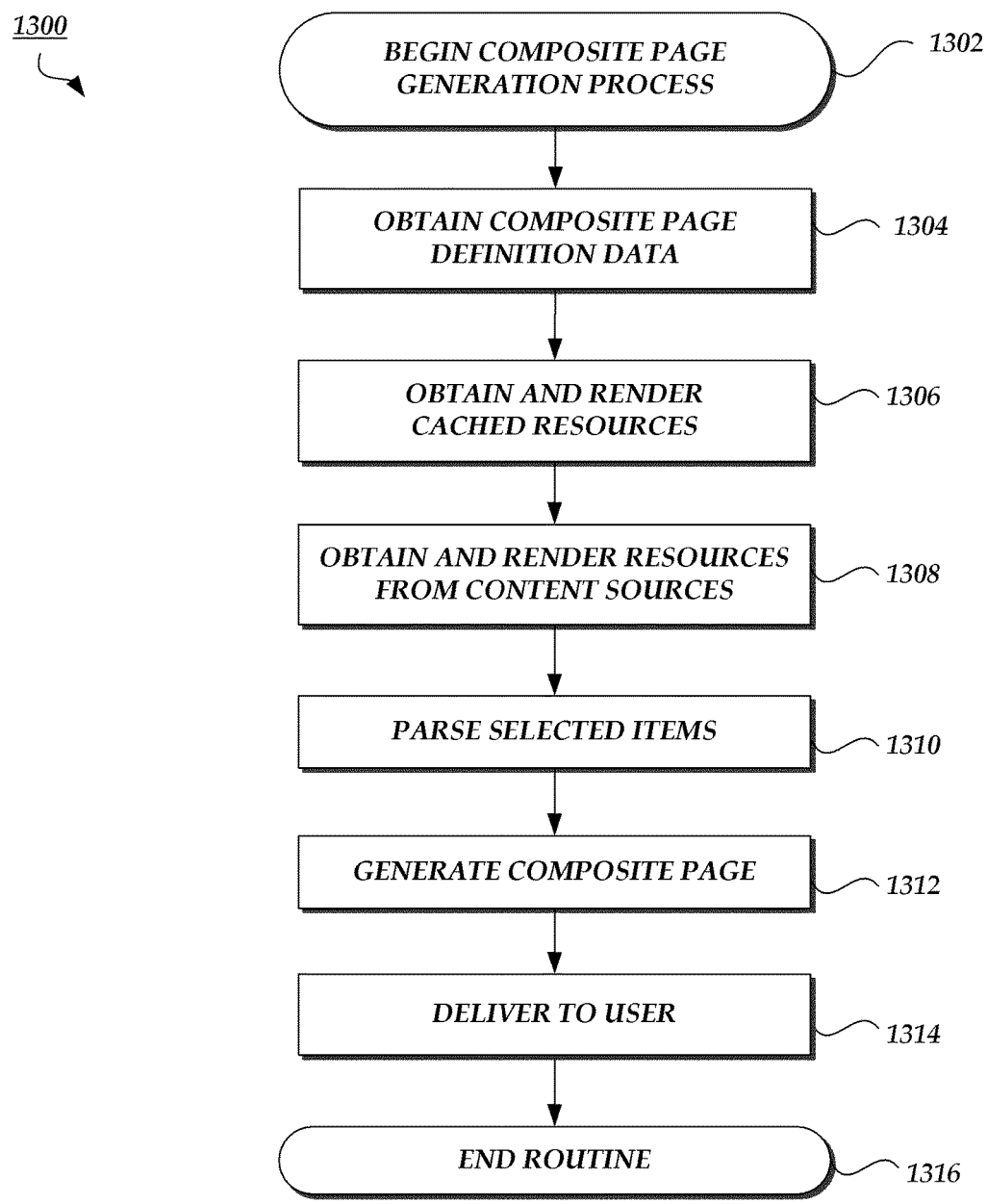
FIG. 13 is a flow diagram illustrative of a routine implemented by a network computing provider for generating a composite content page with selected content items from various content sources.

FIG. 13 illustrates a sample routine 1300 for generating a composite page. The routine 1300 can be implemented by an NCC or some other component of a network computing provider 107. Alternatively, the routine 1300 or some variant thereof may be used by a client computing device 102 to generate a composite page. In such a case, the client computing device 102 may have an electronic data store containing data representing the content items that have been selected for inclusion in the composite page, as well as data indicating how to process and display the page. Generally described, the process utilized by a client computing device 102 in such as case is similar to the process utilized by the NCC, and therefore the description which follows may apply to both implementations.

At block 1302, the routine 1300 begins execution. The routine 1300 may begin in response to a user-initiated event, such as by activating a toolbar button or menu option in the browser, typing a URL for the composite page into the address bar of the browser, and the like. In some embodiments, the routine 1300 may be initiated without user interaction. For example, the NCC may be configured to generate an updated composite page at predetermined or dynamically determined intervals, such as every morning at a specified time so that the composite page can be made immediately available to the user when the user powers on a client computing device 102. In another example, the NCC may be configured to monitor the source web pages corresponding to the selected content items, and may generate an updated composite page each time a change is detected so that the composite page may be made immediately available to the user at any time of the day.

At block 1304, the NCC obtains data defining the composite page. The data may include records indicating the selected content items to include, the network address of the source web site, any formatting to apply to the content item, and the location where the formatted content item is to be placed within the composite page. Additionally, the data may include which security measures to take when generating the composite page.

At block 1306, the NCC can obtain any content items or component resources which may be stored in a cache component of the network computing provider 107. As described above, the NCC or another component of the network computing provider 107 may be configured to monitor the source web pages corresponding to content items. In some embodiments, the NCC can cache updated source web pages or individual selected content items. Additionally, the NCC can be configured to monitor requests from other users of client computing devices 102, and when a second user requests a web page which contains a content item selected by the first user for inclusion in the first user's composite page, the web page or components thereof may be cached. This may be particularly beneficial when implemented by a network computing provider 107 which processes browsing requests from a large number of users each day, and which also has access to a large quantity of electronic storage space.

At block, 1308, the NCC can obtain source web pages from content providers and other content sources when the web page is not available in a cache. The NCC can launch any number of browser instances to process the cached source web pages, and the source web pages retrieved from content providers, in order to obtain the selected content items. For example, the NCC may launch a separate browser instance for the source web page corresponding to each selected content item. The NCC may then direct each browser instance to retrieve a source web page from its location, whether a cache component or a content provider. The browser instances can then process the source web page according to a browsing configuration, as described above. In some embodiments, the browser instances at the NCC may completely process and render each source web page regardless of which browsing configuration may be applied to the source web page when it is requested directly. This may be desirable because some source web pages may not include all of their content in the HTML file or stream that is originally transmitted by the content provider, but rather dynamically build some or all of their content in the browser through the use of JavaScript and other executable code. In such cases, completely processing and rendering the source web page in the browser instance allows the NCC to copy the individually selected content items when laying out the composite page.

At block 1310, the NCC can parse out or otherwise copy the selected content items from the rendered source web pages, and at block 1312 the NCC can generate the composite page from the parsed or copied content items. The procedures may in some cases be performed iteratively for each content item. In some cases, the procedures may be performed sequentially, with each content item being parsed before the final HTML response page is generated. At this state of the routine 1300, the NCC can also perform any sanitizing or other pre-emptive actions that may be beneficial in reducing the risk of various security breaches.

One problem, among others, presented by compiling pieces of web pages from different content providers and other content sources is the potential for cross-site scripting and other attacks. Such attacks generally occur when a server or other network computing component includes data received from a third party source in its responses. The third party source may be a separate content provider, or in many cases the third party source may be a malicious user. If the data from the third party is not sanitized prior to inclusion in the response, any malicious code in the data may be permitted to execute on the client computing device, where it may have access to personal user data, such as may be contained elsewhere in the web page, in the user's cookies, etc. For example, a user may unknowingly select, for inclusion in the composite page, a content item containing malicious code. The malicious code may track user browsing interactions or access cookies to obtain personal information. If the NCC were to include the content item with the malicious code in the composite page, the malicious code may then have access to the cookies associated with the composite page and the other content items within the composite page. Moreover, third parties may recognize that content items are being selected for inclusion in composite pages, and engineer malicious code specifically to exploit the situation and potentially access a user's sensitive data. Because the user and the client computing device 102 may grant the network computing provider 107 a greater level of trust than it would with the individual providers of content items, security risks which would normally pass without incident may be compounded.

Therefore, the NCC can sanitize or otherwise process the rendered web pages and/or the individual content items when it parses them or otherwise copies them for inclusion in the composite page. For example, the NCC can encrypt sensitive data, prior to including it in a composite page or transmitting it to a client computing device 102, so that other content items of the composite page do not have access to the sensitive data. In such a case, the NCC can have access to the appropriate decryption keys so that the NCC can continue to operate on behalf of the user while retrieving content items. User interactions with the composite page may result in new requests being transmitted from the client computing device 102 to the NCC, and some data may be transmitted with those requests, such as hidden input fields, query strings appended to hyperlinks, AJAX transmissions, and the like. The NCC can decrypt the information received with the request in order to act on behalf of the user and to fulfill the request.

The NCC can also filter or otherwise modify the content items to minimize the risk of malicious activity. In some embodiments, sanitizing may include checking the content against a database of known malicious code or removing any executable code. The NCC can also check content against a database of known safe code, rather than known malicious code. For example, web pages may include a standard JavaScript library for facilitating navigation. The NCC can determine that the JavaScript library is safe and therefore permit the JavaScript code to remain in the selected content item, while blocking or stripping out JavaScript and other code that is not known to be safe.

In some embodiments, sanitizing may include using a processed HTML copy of the content item, a static image of the content item, or only the unformatted text of the content item. For example, the browser component of the NCC may execute any JavaScript code that affects the display of the web page. The JavaScript code can have access to the document object model (DOM) or some other representation of the web page, as it would in normal operation, and therefore the JavaScript code can modify the content, appearance, or behavior or any portion of the web page. When the JavaScript code has finished, the DOM can be accessed to copy the unformatted text of the content item for inclusion in a re-formatted portion of the composite page. In some cases, the DOM can be serialized into an HTML representation, without any JavaScript, of the web page or the content item that can be included in the composite page. In some embodiments, sanitizing my include other measures, such as including code in the HTML response page to monitor potential security risks and notify the user and/or the NCC before a breach occurs.

Using the page definition data obtained in block 1304, the NCC can generate a response HTML page with each selected content item reproduced at the location specified in the page definition. For example, page definition data may indicate that certain content items of the composite page are to be displayed as text only. There NCC can copy the text of the content item from the browser instance that has processed the corresponding source web page. The text can then be included in the response HTML page. Depending on any formatting settings included in the page definition data, the text may be copied as unformatted text to be included in the response HTML page. Markup tags and other formatting information can be embedded in the response HTML page, such as bolding for headlines, the addition of links to the source web page, table elements to control the layout of the response HTML page, etc.

In some embodiments, the page definition data may indicate that some content items are to be transformed or otherwise reformatted. For example, calendars may be transformed from monthly views into weekly or agenda views, stock tickers may be transformed into various graphs and tables, and the like. Such formatting is made possible by the processing of the NCC. Source content need not be provided in a specific format, such as RSS, because the NCC can be configured to reformat and extract information from any content source. The NCC can automatically determine the procedures necessary to format content to a user's needs, present the user with a selection of templates to apply to content items, or the user can customize the formatting through an interface provided by the browser or the NCC.

The page definition data may indicate that some content items are to retain any formatting from the source web page. In such cases, the NCC can be configured to copy the HTML code containing the content item from the browser instance that has processed the corresponding source web page. In cases when the HTML code does not contain all of the information required to reproduce the content item, such as when the content item is generated dynamically in the browser by JavaScript code, the NCC can generate HTML that closely approximates the layout of the rendered content item by allowing the JavaScript to execute at the NCC, and then serializing the modified DOM into an HTML content item that can be included in the response HTML page. In some embodiments, the NCC can generate a static image of the content item for inclusion in the response HTML page. This approach can ensure that the original formatting is maintained, and also reduce security risks associated with copying HTML code from a third party for inclusion in the response HTML page.

In some embodiments, the composite page may include any number of iframes or equivalent objects. For example, the source of each iframe can be a page hosted by the NCC specifically for the purpose of including it in a composite page. In some embodiments, the NCC can include code in the response which facilitates further configuration by the user at the client computing device 102. For example, the various content items of the composite page may be able to be repositioned by the user, and data can be transmitted to the NCC regarding the updated location of a moved content item.

At block 1314, the NCC can deliver the composite page to the user. In some embodiments, the user may have access to the composite page on more than one client computing device 102. In some embodiments, the NCC can be configured to update the composite page periodically or in response to an event, as described above. In such cases, the NCC can utilize the routine 1300 in order to do so, and at block 1314 the NCC can cache the composite page rather than transmitting it to the user.

While illustrative embodiments have been disclosed and discussed, one skilled in the relevant art will appreciate that additional or alternative embodiments may be implemented within the spirit and scope of the present invention. For example, the techniques described herein may be utilized, without departing from the scope of the present invention, to allow remote processing management in any number of other software applications and processes, including, but not limited to, image or video editing software, database software, office productivity software, 3d design software, audio and sound processing applications, etc. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present Any process descriptions, elements, or blocks in the flow diagrams described herein and/or depicted in the attached FIGURES should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for compiling content items into a composite resource, the system comprising:
    a network computing component comprising one or more hardware server computing devices, the network computing component configured to execute a browsing application and operable to:
        obtain, from a client computing device separate from the network computing component, browsing configuration information associated with a client-based browsing application;
        obtain selection information identifying a plurality of content items to be included in a composite network resource, wherein a content item of the plurality of content items comprises a portion of a corresponding network resource of a plurality of network resources;
        determine, by the network computing component, to process a first subset of network resources of the plurality of network resources in one or more instances of the browsing application based on the browsing configuration information;
        render, using a first instance of the browsing application, a first secure display portion of a first content item of the first subset of network resources;
        render, using a second instance of the browsing application, a second secure display portion of a second content item of the first subset of network resources;
        determine, by the network computing component, to process a second subset of network resources of the plurality of network resources in the client-based browsing application based on the browsing configuration information;
        obtain an unprocessed content item of the second subset of network resources;
        generate the composite network resource including the first and second secure display portions from the first subset of network resources and the unprocessed content item from the second subset of network resources; and
        transmit the composite network resource to the client computing device, wherein the client computing device displays the first and second secure display portions and processes the unprocessed content item to render the unprocessed content item for display.

2. The system of claim 1, wherein the network computing component is further operable to remove embedded code from the first subset of network resources.

3. The system of claim 1, wherein a display portion of a content item comprises at least one of a static image, a textual copy, or a reformatted copy.

4. The system of claim 1, wherein the browsing application of the network computing component is in communication with the client-based browsing application of the client computing device.

5. The system of claim 1, wherein at least one of the content items is selected by a user of the client computing device.

6. The system of claim 1, wherein at least one of the content items is selected by the network computing component.

7. The system of claim 1, wherein generating the composite network resource occurs at predetermined intervals.

8. The system of claim 1, wherein the network computing component being operable to render the first secure display portion comprises the network computing component being operable to encrypt user information associated with the first content item.

9. The system of claim 1, wherein the network computing component is further operable to determine that a first network resource of the first subset of network resources is to be processed in an instance of the one or more instances of the browsing application into a visual format that differs from a visual format specified by the first network resource.

10. The system of claim 1, wherein the network computing component is further operable to:
    obtain additional selection information regarding selections, by a plurality users, of content items of a first network resource of the plurality of network resources; and determine, based at least partly on the additional selection information, a default content item for the first network resource.

11. The system of claim 10, wherein the network computing component is operable to determine the default content item based at least partly on weighting individual selections differently based on context of the individual selections.

12. The system of claim 11, wherein the network computing component is operable to weight recent content item selections more heavily than older content item selections.

13. The system of claim 1, wherein the network computing component is operable to identify a selected content item of the plurality of content items based at least partly on an analysis of markup code corresponding to a selected region of a network resource of the plurality of network resources.

14. A computer-implemented method comprising:
as implemented by a server system comprising one or more computing devices configured to execute specific instructions,
obtaining, from a client computing device separate from the server system, browsing configuration information associated with a client-based browsing application;
obtaining selection information identifying a plurality of content items to be included in a composite network resource;
determining, by the server system, to process a first subset of network resources of the plurality of network resources in one or more instances of a server-side browsing application executed by the server system based on the browsing configuration information;
rendering, using a first instance of the server-side browsing application, a first secure display portion of a first content item of the first subset of network resources;
rendering, using a second instance of the server-side browsing application, a second secure display portion of a second content item of the first subset of network resources;
determining, by the server system, to process a second subset of network resources of the plurality of network resources in the client-based browsing application based on the browsing configuration information;
obtaining an unprocessed content item of the second subset of network resources;
generating the composite network resource including the first and second secure display portions from the first subset of network resources and the unprocessed content item from the second subset of network resources; and
transmitting the composite network resource to the client computing device, wherein the client computing device displays the rendered display portion and processes the unprocessed content item to render the unprocessed content item for display.

15. The computer-implemented method of claim 14, wherein rendering the first secure display portion comprises encrypting user information associated with the first content item.

16. The computer-implemented method of claim 14, wherein rendering the first secure display portion comprises generating at least one of: a static image, a textual copy, or a reformatted copy.

17. The computer-implemented method of claim 14, further comprising determining that a first network resource of the first subset of network resources is to be processed in an instance of the one or more instances of the browsing application into a visual format that differs from a visual format specified by the first network resource.

18. The computer-implemented method of claim 14, further comprising identifying a selected content item of the plurality of content items based at least partly on an analysis of markup code corresponding to a selected region of a network resource of the plurality of network resources.

19. The computer-implemented method of claim 18, further comprising analyzing the markup code corresponding to the selected region of the network resource to identify a tag associated with the selected content item.

20. The computer-implemented method of claim 14, wherein obtaining the selection information comprises obtaining selection information representing activation of a user interface option for adding a default content item of a network resource to the composite network resource.

21. The computer-implemented method of claim 14, further comprising determining a default content item based at least partly on an analysis of a selection history of the user.

22. The computer implemented method of claim 14, further comprising:
calculating a relative popularity of each content item of a plurality of content items of a corresponding network resource;
adjusting a calculation for a particular content item, of the plurality of content items of the corresponding network resource, based on at least one of: a date a selection of the particular content item was made, a pattern in content item selections of other users who have accessed the corresponding network resource, or a current season; and
determining the particular content item as a default content item based at least partly on the calculation.

23. The computer-implemented method of claim 14, wherein generating the composite network resource comprises generating the composite network resource wherein the first secure display portion is to be provided using a display-based communication protocol, and wherein the unprocessed content item is to be provided using a hypertext-based communication protocol.

24. The computer-implemented method of claim 14, wherein the first instance of the server-side browsing application executes in parallel with the second instance of the server-side browsing application, and wherein the first instance of the server-side browsing application is blocked from accessing the second instance of the server-side browsing application.

* * * * *